United States Patent
Albartus et al.

(10) Patent No.: US 10,385,563 B2
(45) Date of Patent: *Aug. 20, 2019

(54) ANCHORING RAIL FOR ANCHORING IN CONCRETE

(71) Applicant: HALFEN GmbH, Langenfeld (DE)

(72) Inventors: Dirk Albartus, Bochum (DE); Frank Haeusler, Duesseldorf (DE); Dirk Borgstede, Leichlingen (DE); Andreas Hanke, Leichlingen (DE)

(73) Assignee: HALFEN GmbH, Langenfeld (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/132,029

(22) Filed: Apr. 18, 2016

(65) Prior Publication Data

US 2016/0305115 A1 Oct. 20, 2016

(30) Foreign Application Priority Data

Apr. 18, 2015 (EP) .................... 15001146

(51) Int. Cl.
*E04B 1/41* (2006.01)
*E04C 3/04* (2006.01)
*F16B 37/04* (2006.01)

(52) U.S. Cl.
CPC .... *E04B 1/4107* (2013.01); *E04C 2003/0473* (2013.01); *F16B 37/047* (2013.01)

(58) Field of Classification Search
CPC ........ E04B 1/41; E04B 1/4107; E04B 1/4114; E04B 1/4135; E04C 5/12; E04C 2003/0473; F16B 37/047
USPC ..... 52/223.13, 698, 699, 702, 704–708, 710
See application file for complete search history.

(56) References Cited

U.S. PATENT DOCUMENTS

| 602,274 A | 4/1898 | Sill |
| 909,769 A * | 1/1909 | Downing .............. E04B 1/4135 248/343 |
| 1,073,906 A | 9/1913 | Kahn |
| 1,142,093 A | 6/1915 | Harp |
| 1,170,743 A | 2/1916 | Evers |

(Continued)

FOREIGN PATENT DOCUMENTS

| DE | 2 058 420 A1 | 6/1972 |
| DE | 19718230 A1 | 1/1998 |

(Continued)

OTHER PUBLICATIONS

Machine translation of foreign reference FR2516184, obtained from http://translationportal.epo.org/emtp/translate/?ACTION=description-retrieval&COUNTRY=FR&ENGINE=google&FORMAT=docdb&KIND=A1&LOCALE=en_EP&NUMBER=2516184&OPS=ops.epo.org/3.2&SRCLANG=fr&TRGLANG=en (last accessed on Jun. 26, 2018) (Year: 2018).*

*Primary Examiner* — Theodore V Adamos
(74) *Attorney, Agent, or Firm* — Walter Ottesen, P.A.

(57) ABSTRACT

The invention relates to an anchoring rail with a substantially C-shaped cross section for anchoring in concrete. The anchoring rail includes a cross sectionally substantially U-shaped base body, two free limbs and at least one anchor. The base body includes a base and two side walls. The two free limbs are arranged opposite the base of the base body. The at least one anchor is arranged on the base. Between the free limbs, a slot is formed in the longitudinal direction of the anchoring rail. The anchoring rail has at least one thickened portion on the base body.

15 Claims, 9 Drawing Sheets

(56) References Cited

U.S. PATENT DOCUMENTS

| | | | |
|---|---|---|---|
| 1,179,820 A | 4/1916 | Gilliland | |
| 1,226,045 A | 5/1917 | Wolfe | |
| 1,260,331 A | 3/1918 | Collings | |
| 1,409,984 A | 3/1922 | Whitacre | |
| 1,485,596 A * | 3/1924 | Chase | E04B 1/4107 403/192 |
| 1,710,422 A * | 4/1929 | Kehm | E04B 1/4107 52/711 |
| 1,753,496 A | 4/1930 | Barton | |
| 1,936,223 A | 11/1933 | Awbrey | |
| 2,189,108 A | 2/1940 | Griesel | |
| 2,664,179 A | 12/1953 | Gwynne | |
| 3,129,792 A | 4/1964 | Gwynne | |
| 3,156,450 A * | 11/1964 | Thom | E04B 1/4107 256/65.02 |
| 3,165,815 A | 1/1965 | Wogerbauer | |
| 3,243,930 A | 4/1966 | Slowinski | |
| 3,263,384 A * | 8/1966 | Middendorf | E04C 5/125 24/122.6 |
| 3,325,585 A | 6/1967 | Brenneman | |
| 3,397,497 A | 8/1968 | Shea et al. | |
| 3,462,902 A | 8/1969 | Albrecht et al. | |
| 3,707,815 A | 1/1973 | Molyneux | |
| 3,793,793 A | 2/1974 | Dobbins | |
| 3,812,636 A | 5/1974 | Albrecht et al. | |
| D233,746 S | 11/1974 | Bowser | |
| 3,902,288 A | 9/1975 | Knudson | |
| 3,918,224 A * | 11/1975 | Sundequist | H01R 25/14 174/491 |
| 4,003,177 A | 1/1977 | De La Concha | |
| 4,052,833 A * | 10/1977 | Beine | E04B 1/4107 403/284 |
| 4,078,515 A | 3/1978 | Svirkleys | |
| 4,109,438 A | 8/1978 | De La Concha | |
| 4,144,369 A | 3/1979 | Wass | |
| 4,211,045 A | 7/1980 | Koizumi et al. | |
| 4,453,364 A | 6/1984 | Ting | |
| 4,513,551 A | 4/1985 | Gauffin et al. | |
| 4,571,912 A * | 2/1986 | Fricker | E04B 1/4107 411/400 |
| 4,579,785 A | 4/1986 | Karoubas | |
| 4,580,388 A | 4/1986 | Maisch | |
| 4,593,506 A | 6/1986 | Hartman et al. | |
| 4,675,238 A | 6/1987 | Karoubas | |
| 4,739,601 A * | 4/1988 | Beine | E04B 1/4107 29/432 |
| 4,742,655 A * | 5/1988 | Kovasna | E04G 21/125 52/364 |
| 4,781,001 A | 11/1988 | Ryan | |
| 4,783,946 A | 11/1988 | Boegle | |
| 4,793,113 A | 12/1988 | Bodnar | |
| 4,878,640 A * | 11/1989 | Fricker | E04B 1/4107 248/297.21 |
| 4,961,553 A | 10/1990 | Todd | |
| 4,962,622 A | 10/1990 | Albrecht et al. | |
| 5,157,883 A | 10/1992 | Meyer | |
| 5,285,615 A | 2/1994 | Gilmour | |
| 5,315,804 A | 5/1994 | Attalla | |
| 5,392,581 A | 2/1995 | Hatzinikolas et al. | |
| 5,417,028 A | 5/1995 | Meyer | |
| 5,586,418 A | 12/1996 | Alander et al. | |
| 5,592,796 A | 1/1997 | Landers | |
| 5,729,951 A * | 3/1998 | Frohlich | B21K 25/00 52/698 |
| 6,009,678 A | 1/2000 | Franco da Encarnacao | |
| 6,145,259 A | 11/2000 | Koenig, Jr. et al. | |
| 6,205,740 B1 | 3/2001 | Ekerholm et al. | |
| 6,381,916 B1 | 5/2002 | Maisch et al. | |
| 6,481,175 B2 | 11/2002 | Potter et al. | |
| 7,028,441 B2 | 4/2006 | Dahl | |
| 7,257,932 B2 | 8/2007 | Ng | |
| D618,365 S | 6/2010 | Crane | |
| D621,964 S | 8/2010 | Zadeh | |
| 8,028,495 B2 | 10/2011 | Knauf | |
| 8,028,557 B2 | 10/2011 | Voth | |
| 8,056,303 B2 | 11/2011 | Frobosilo | |
| D651,324 S | 12/2011 | You | |
| 8,225,581 B2 | 7/2012 | Strickland et al. | |
| 8,359,813 B2 | 1/2013 | Bodnar | |
| 2006/0123726 A1 | 6/2006 | Azarin | |
| 2008/0110126 A1 | 5/2008 | Howchin | |
| 2009/0013633 A1 | 1/2009 | Aubuchon | |
| 2009/0064626 A1* | 3/2009 | Sen | F16B 37/045 52/699 |
| 2009/0100776 A1 | 4/2009 | Seccombe | |
| 2009/0223167 A1 | 9/2009 | Anderson | |
| 2009/0249743 A1 | 10/2009 | Bodnar | |
| 2010/0031597 A1 | 2/2010 | Baek | |
| 2010/0101175 A1 | 4/2010 | Hohmann | |
| 2010/0146904 A1* | 6/2010 | Heudorfer | E04B 1/4107 52/699 |
| 2010/0170185 A1* | 7/2010 | Birnbaum | E04B 1/4107 52/699 |
| 2013/0145720 A1* | 6/2013 | Heudorfer | E04B 1/4107 52/710 |
| 2014/0250825 A1* | 9/2014 | Richardson | E04B 1/4107 52/710 |
| 2014/0318072 A1 | 10/2014 | Lee | |
| 2014/0318074 A1* | 10/2014 | Heudorfer | E04B 1/4107 52/710 |
| 2016/0305114 A1* | 10/2016 | Albartus | F16B 37/045 |

FOREIGN PATENT DOCUMENTS

| | | | |
|---|---|---|---|
| DE | 197 25 882 A1 | 12/1998 | |
| DE | 10014977 A1 | 9/2001 | |
| DE | 102007014795 A1 | 10/2008 | |
| DE | 20 2009 012 533 U1 | 2/2010 | |
| DE | 102011080181 A1 | 2/2013 | |
| DE | 202015003443 U1 | 5/2015 | |
| EP | 0035634 A2 | 9/1981 | |
| EP | 1865118 A2 | 12/2007 | |
| EP | 2 478 163 A1 | 7/2012 | |
| EP | 3112543 A1 | 1/2017 | |
| FR | 2516184 A1 * | 5/1983 | E04G 5/04 |
| GB | 1062806 A | 3/1967 | |
| JP | 53097942 A | 8/1978 | |
| JP | H09177184 A | 7/1997 | |
| KR | 100668112 B1 | 1/2007 | |
| WO | 2011076606 A1 | 6/2011 | |
| WO | 2013013375 A1 | 1/2013 | |

* cited by examiner

ANCHORING RAIL FOR ANCHORING IN CONCRETE

CROSS REFERENCE TO RELATED APPLICATION

This application claims priority of European patent application no. 15001146.8, filed Apr. 18, 2015, the entire content of which is incorporated herein by reference.

BACKGROUND OF THE INVENTION

An anchoring rail of the type in question is known from EP 2 478 163 B1. Anchoring rails of this type are cast into concrete in order then to be able to fasten objects thereon with the aid of rail nuts, engage behind parts, head screws or hammer head screws. Together with such fastening elements, the anchoring rail forms a fastening system. The weight of the fastened objects is transmitted via the rail geometry and the anchor of the anchoring rail into the concrete. In the process, cracks may arise in the concrete. For the controlled formation of cracks, crack initiator means are provided on the anchoring rail in EP 2 478 163 B1.

In addition to a possible failure of the fastening of the anchoring rail in the concrete, a failure of the material of the anchoring rail itself is the greatest source of uncertainty for an anchoring rail based fastening system. Under landing by the weight of an object fastened to an anchoring rail or due to other forces, the connecting point of anchor and rail of the anchoring rail is exposed to a large loading. Some of the weight is transmitted to the base of the anchoring rail via the limbs and the side walls of the anchoring rail. This may lead to deformation of the anchoring rail, wherein the region of the connection of anchor and base is typically secured by the anchor secured in the concrete and the regions of the base that are further away from the connecting point are bent in a direction away from the anchor. In a following step, the base may tear out at the connecting point between base and anchor, whereupon the stability of the entire anchoring rail and the fastening thereof is impaired. A further point of weakness of the anchoring rail is represented by the free limbs of the anchoring rail. A large part of the weight of a fastened object is typically transmitted via the head of a head screw to the free limbs of the anchoring rail. In this connection, the free limbs may bend upward in a direction away from the anchor of the anchoring rail. In the extreme case, the free limbs of the anchoring rail are bent up to such an extent that the head of the head screw can no longer be held in the slot formed between the free limbs in the longitudinal direction of the anchoring rail. This also greatly impairs the stability of the anchoring rail.

SUMMARY OF THE INVENTION

It is an object of the invention to provide an anchoring rail which, when embedded in concrete, is highly stable in relation to the loading by forces acting thereon.

The anchoring rail of the invention is for anchoring in concrete. The anchoring rail defines a longitudinal direction and includes: a base body defining a substantially U-shaped cross-section; a first and a second free limb; at least one anchor; the base body including a base and a first and a second side wall; the first and the second free limbs being arranged opposite the base of the base body; the at least one anchor being fixed to the base; the first and the second free limbs conjointly defining a slot extending in the longitudinal direction between each other; and, a thickening on the base body.

For this purpose, it is provided that the anchoring rail has at least one thickened portion on the base body. The base body of the anchoring rail includes at least the side walls of the anchoring rail. A base of the anchoring rail is also part of the base body. The free limbs of the anchoring rail, which limbs are connected to the side walls of the base body, are not part of the base body. The thickened portion is advantageously arranged in a base body region which, when an object is fastened to the anchoring rail, is exposed to particularly large loadings because of the weight of the fastened object. Thickened portion refers here to the thickened portion of the wall thickness in a region of the base body of the anchoring rail or of the free limb of the anchoring rail in comparison to the smallest wall thickness of the base body and of the free limb. The thickness of the thickened portion is advantageously between 5% and 100% of the smallest wall thickness. The wall thickness of a thickened region of the base body or of the limb of the anchoring rail can thus advantageously be between 105% and 200% of the smallest wall thickness of base body and limbs of the anchoring rail. The thickness of a thickened portion is advantageously within the range of between 10% and 70% of the smallest wall thickness. Furthermore, the thickness of a thickened portion advantageously lies within the range of between 20% and 50% of the smallest wall thickness.

The wall thickness of the base body and of the free limb of the anchoring rail varies via a thickened portion in a cross section transversely with respect to the longitudinal direction of the anchoring rail. Via this selective thickened portion of the base body or of the free limb, the stability of the anchoring rail is increased while simultaneously avoiding unnecessary use of material. Since the anchoring rail is advantageously reinforced only at the points which are customarily subjected to a large loading, material can be saved in comparison to a homogeneous thickened portion of the entire base body and of the free limb. The material saving is associated with a saving of weight and material costs.

In an advantageous embodiment of the invention, the thickened portion on the base of the base body of the anchoring rail is arranged at least in the region of at least one anchor and is configured as a base thickened portion. The region in which the base thickened portion is arranged is advantageously at least twice the size of the contact surface between anchor and base of the anchoring rail. The anchor is advantageously arranged in the center of the base thickened portion. When an object is fastened to the anchoring rail, a large part of the weight of the fastened object is transmitted via the base and the anchor into the concrete. In this connection, the anchor is held by the anchoring thereof in the concrete while the base pulls on the anchor. The corresponding tensile forces are transmitted here to the connecting point between anchor and base. Under great loading by the tensile forces, the base may tear out at the connecting point to the anchor. During the tearing out, a hole arises in the base, and anchor and base are separated from each other. This leads to a severe reduction in the stability of the fastening system. If a plurality of anchors tear out, the entire anchoring rail may itself become detached from the concrete under the weight of the fastened object and of the anchoring rail. A thickened portion of the base in the region of the anchor reinforces the base in the region which is customarily exposed to large loadings and thus reduces the risk of the base tearing out in the region of the connecting point between anchor and base. A base thickened portion in the region of an anchor improves the load bearing capability of the anchoring rail. Via a base thickened portion in the region of an anchor, the ultimate load which can be maximally carried by the anchoring rail is greater.

In an advantageous embodiment of the invention, it is provided that the base thickened portion extends over the entire longitudinal extent of the base and that the base thickened portion extends at least over a partial width of the base transversely with respect to the longitudinal direction of the anchoring rail. The width of the base is measured transversely with respect to the longitudinal direction thereof. The partial width of the base over which the base thickened portion extends is advantageously at least 30% of the entire width of the base of the anchoring rail. The base thickened portion advantageously runs in the center between the two side walls of the anchoring rail. The width of the base thickened portion is advantageously at least twice the width of an anchor transversely with respect to the longitudinal direction of the base at the connecting point of anchor and base. The anchors are arranged in the center of the base with respect to the direction transverse to the longitudinal direction of the base. Since the anchors of the anchoring rail are arranged in the center of the base with respect to the direction transverse to the longitudinal direction of the anchoring rail, the connecting points of all of the anchors to the base are reinforced by an extension of the base thickened portion over the entire longitudinal extent of the base. In addition to the already described reduction in the risk of the base tearing out in the region of the anchor under loading by the weight of a fastened object, the anchoring rail is also reinforced by such a base thickened portion in relation to bending of the base in the region between two adjacent anchors. Such a bending may occur in particular if the holding point—for example a head screw—of a heavy fastened object is positioned between two adjacent anchors. In particular, the anchoring rail may then become detached from the concrete between the two adjacent anchors concerned and bend in the direction away from the two anchors. The risk of such a bending of the base of the anchoring rail is reduced by a base thickened portion over the entire longitudinal extent of the base. Furthermore, a base thickened portion which extends over the entire longitudinal extent of the base in the region of the anchors can be produced more simply than base thickened portions which are restricted merely to the region of the anchors and are interrupted in the longitudinal extent of the base between the anchors. A base thickened portion which extends over the entire longitudinal extent of the base can be produced by rolling. In particular, such a base thickened portion of an anchoring rail made of steel can be produced by cold rolling. By this means, a large quantity of anchoring rails with a base thickened portion can be produced within a short time in a simple manner.

However, in the event of a large distance of the anchors from one another, it may also be advantageous for the base thickened portion to extend over the entire width of the base in the region of an anchor. In this connection, the base thickened portion may be interrupted in the longitudinal direction of the base. As a result of the interruption in the base thickened portion in the regions between the anchors, material can be saved. The entire anchoring rail is thus lighter and the maximally possible ultimate load of the anchoring rail is greater with simultaneously low material costs.

However, it may also be provided for the base thickened portion to extend over the entire longitudinal extent and the entire width of the base. In this case, the base thickened portion extends over the entire base. Such a base has great stability while being simple to produce.

In an advantageous embodiment of the invention, it is provided that the base thickened portion extends over the entire longitudinal extent and the entire width of the base, and that the base thickened portion is thicker in the region of the arranged anchors than in the region of the base in the vicinity of the side walls. In addition, the thickness profile of the base transverse to the longitudinal direction of the anchoring rail corresponds at any point of the anchoring rail to the thickness profile of the base thickened portion transverse to the longitudinal direction of the anchoring rail in the region of the anchor. Such an embodiment of the anchoring rail ensures additional stability in the region of the connecting points of anchor and base.

In an advantageous embodiment of the invention, it is provided that the thickened portion at at least one side wall is configured as a side wall thickened portion at least in the region in the vicinity of the free limb assigned to the side wall. The outer side of the base of the U shaped base body of the anchoring rail forms a flat plane. The greatest perpendicular distance of any part of the base body from the plane is referred to below as the height of the side wall. The side wall thickened portion extends at least over part of the height of the side wall. The side wall thickened portion extends in the direction of the base from the connecting point of the side wall to one of the free limbs of the anchoring rail. The side wall thickened portion advantageously extends over a range of from 5% to 70% of the height of the side wall. The side thickened portion advantageously extends over a range of from 10% to 60% of the height of the side wall. Furthermore advantageously, the side wall thickened portion extends over a range of from 20% to 60% of the height of the side wall. In particular, the side wall thickened portion extends over 50% of the height of the side wall. Since the side wall thickened portion extends from the transition from one of the free limbs into a side wall of the anchoring rail, the transition itself is also thickened. As a result, the associated free limb is more stable in relation to a possible bending up of the limb under loading by the weight of an object fastened to the anchoring rail or by another force. This also leads to improved load bearing capability and to an increase in the maximally tolerable ultimate load of the anchoring rail. In addition, the side wall thickened portion described leads to increased stability of the anchoring rail in relation to forces which have at least one vectorial component≠0 in a direction transverse to the longitudinal direction of the anchoring rail. Such transverse forces may arise, for example, due to the weight of an object fastened to the anchoring rail or else due to wind force acting on the fastened object. Via the side wall thickened portion extending over part of the height of the side wall, the anchoring rail, while having a low weight, is stable in relation to such transverse forces and to bending up of the limbs of the anchoring rail.

In an advantageous embodiment of the invention, the side wall thickened portion extends over the entire height of the side wall. A side wall thickened portion which extends over the entire height of the side wall further increases the stability of the anchoring rail in relation to bending up of the limbs and in relation to forces which act at least partially transversely to the longitudinal direction of the anchoring rail. At the same time, an anchoring rail with a side wall, the side wall thickened portion of which extends over the entire height of the side wall, is simpler to produce than an anchoring rail with a side wall, in which the side wall thickened portion extends only over part of the height of the side wall.

In an advantageous embodiment of the invention, it is provided that at least one limb has a limb thickened portion, at least in the region in the vicinity of the side wall assigned to the limb. The thickness of the limb thickened portion is advantageously between 5% and 100% of the smallest wall thickness of the unthickened limb or of an unthickened region of the base body. The wall thickness of a thickened region of the limb of the anchoring rail can thus advantageously be between 105% and 200% of the smallest wall thickness of the limbs or of the base body of the anchoring rail. The thickness of a limb thickened portion is advantageously within the range of between 10% and 70% of the smallest wall thickness of the limbs or of the base body. Furthermore advantageously, the thickness of a limb thickened portion is within the range of between 20% and 50% of the smallest wall thickness of the limb or of the base body.

The limb thickened portion extends in the direction of the slot in the anchoring rail from the connecting point of a sidewall to one of the two free limbs. The extension of the limb from the connecting point of a side wall as far as the closest edge of the slot in the anchoring rail is referred to below as the width of a limb. The two limbs advantageously have the same width. The limb thickened portion extends at least over a partial width of the limb. The limb thickened portion extends from the connecting point of a side wall and a limb over a range of from 5% to 70% of the width of the limb. The limb thickened portion advantageously extends over a range of from 10% to 60% of the width of the limb. Furthermore advantageously, the limb thickened portion extends over a range of from 20% to 60% of the width of the limb. In particular, the limb thickened portion extends over 50% of the width of the limb. The limb thickened portion also results in a reinforcement of the region of the connecting point of the associated limb and the associated side wall. As a result, the stability of the anchoring rail against bending up of the limbs under loading by the weight of an object fastened to the anchoring rail or by another force is increased. The limb thickened portion increases the ultimate load maximally tolerated by the anchoring rail.

The limb thickened portion advantageously extends over the entire width of the limb. This simplifies the production of the anchoring rail and increases the stability of the anchoring rail in comparison to a limb thickened portion which is formed merely in the region in the vicinity of the side wall assigned to the limb. The stability of the anchoring rail in particular in relation to bending up of the limbs under loading by the weight of an object fastened to the anchoring rail is improved. However, a limb thickened portion which extends over the entire width of the limb also leads to a better absorption of forces which at least partially act transversely to the longitudinal direction of the anchoring rail and transversely to the longitudinal direction of the anchor. Such a force is transmitted via one of the two free limbs to the associated side wall. If the limb thickened portion extends over the entire width of the limb, the limb is more stable in relation to such transverse forces and can transmit the transverse forces reliably, without being deformed, to the associated side wall.

In an advantageous embodiment of the invention, the anchoring rail has a transition thickened portion in the region of at least one transition from the side wall into the free limb assigned to the side wall. The transition thickened portion increases the stability of the anchoring rail in relation to bending up of the free limbs under the loading by a force acting on the limbs.

In an advantageous manner, all of the described thickened portions of the base body and of the limbs of the anchoring rail can be combined with one another as desired. In an advantageous embodiment of the invention, it is provided that the base body has a plurality of thickened portions and that the thickness of all of the thickened portions is identical. As a result, the production of the anchoring rail is simplified.

In an advantageous embodiment of the invention, it is provided that the wall thickness of at least one limb increases from the side wall, which is assigned to the limb, of the anchoring rail towards the slot in the anchoring rail. It is thereby possible for that surface of the limb which faces away from the anchor to be oriented at a right angle to the side wall associated with the limb and at the same time for the inner side of the limb, which inner side faces the anchor, to enclose an angle <90° with the associated side wall. The limb thereby forms a type of hook over the entire longitudinal extent thereof. At the same time, that surface of the limb which faces away from the anchor can form a flat surface with the concrete in which the anchoring rail is embedded. This ensures an attractive appearance of an anchoring rail region not occupied by a fastened object and increases the supporting surface for an object to be fastened. The limb connected to the side wall has a hook shaped profile in a cross section transverse to the longitudinal direction of the anchoring rail. For the fastening of an object with the aid of the anchoring rail, a head screw is typically introduced into the slot in the anchoring rail. The head screw can be in particular a hammer head screw. The profile of the introduced hammer head screw advantageously corresponds to the profile of the inner side surface of the limb. The hammer head screw includes a head and a threaded shank. That side of the head of the hammer head screw that faces away from the threaded shank is flat and is oriented orthogonally to the threaded shank. That surface of the head of the hammer head screw which faces the threaded shank forms an angle <90° with the threaded shank and corresponds to the size of the angle enclosed by the side wall and the inner side of the limb. When the hammer head screw is fastened between the limbs of the anchoring rail, that surface of the hammer head screw which faces the threaded shank and the inner side surface of the limb of the anchoring rail, which surface faces the anchor, come to lie flush on each other. In a cross section transverse to the longitudinal axis of the anchoring rail through the head screw, the head of the head screw has a profile in the form of a double hook. If a transverse force acts on the threaded shank, which is oriented parallel to the side walls of the anchoring rail, transversely to the longitudinal direction of the anchoring rail and transversely to the longitudinal direction of the anchor, the threaded shank is held in its position not only via the contact thereof with an end surface of the one limb but also because the surface, which faces the threaded shank, of the head associated therewith is in contact with the other limb. The transverse force acting on the head screw is therefore conducted into the anchoring rail via the two limbs instead of via only one limb. This increases the stability of the fastening system in relation to forces which act on the head screw transversely to the longitudinal direction of the anchoring rail and transversely to the longitudinal direction of the anchor.

In a further advantageous embodiment of the invention, it is provided that the limbs of the anchoring rail and at least that part of the side walls of the anchoring rail that is adjacent to the limbs are oriented orthogonally to each other. Those surfaces of the limbs which face away from the anchor lie here in the same plane. The limbs are advantageously arranged at the ends of the side walls, which ends face away from the anchor, and therefore the side walls together with the limbs form outer edges of the anchoring rails. As a result, the anchoring rail can be cast into concrete in such a manner that the surface of the limbs lies in a plane with the surface of the concrete surrounding the anchoring rail. A flush transition from the limbs of the anchoring rail to the concrete surface is thus possible. As a result, the anchoring rail can be integrated into the concrete in an inconspicuous and attractive manner. This is highly advantageous, for example, when anchoring rails are used in facades of buildings.

In an advantageous embodiment of the invention, it is provided that the side walls are arranged perpendicular with respect to the base. The side walls form outer edges with the base. The two side walls run parallel to each other. The free limbs are arranged at the same height perpendicular to the side walls at that region of the side walls which faces away from the base. However, the free limbs may also be oriented at a different angle to the side walls. As a result of the perpendicular orientation of the side walls to the base, forces occurring transversely to the longitudinal direction of the anchoring rail can be efficiently dissipated into the concrete via the vertical side walls. The forces which occur are initially transmitted here to the side walls via the head screw and/or the free limbs. The perpendicular orientation of the side walls to the base furthermore enables typical head screws to be accommodated in the anchoring rail. In particular, the cross sectional geometry of an anchoring rail manufactured in such a manner is optimally coordinated with the corresponding cross section of a hammer head screw.

The anchoring rail is advantageously manufactured as a single piece from cold-rolled steel. This contributes to greater stability of the anchoring rail. The increased strength of the anchoring rail ensures an increase in the maximally supportable ultimate load by the anchoring rail. As a result of the increased strength of the anchoring rail, the anchoring rail is more stable in relation to bending of the anchoring rail in the event of loading by, for example, the weight of a fastened object. Furthermore, production by cold rolling is significantly more cost effective and energy saving than production by hot rolling. A more stable anchoring rail can thereby be produced with a smaller amount of energy being used.

The anchoring rail advantageously has a substantially C-shaped cross section for anchoring in concrete, wherein the anchoring rail includes a base body which is substantially U-shaped in cross section, two free limbs and at least one anchor, wherein the two free limbs are arranged on the base body opposite the anchor, wherein a slot is formed in the longitudinal direction of the anchoring rail between the free limbs. The anchoring rail is advantageously characterized in that the base body at least partially has a profiling on the outer side thereof facing the concrete.

The anchoring rail advantageously has a substantially C-shaped cross section for anchoring in concrete, wherein the anchoring rail includes at least one anchor, two side walls and two opposite free limbs, wherein a slot is formed in the longitudinal direction of the anchoring rail between the free limbs. The anchoring rail is advantageously characterized in that the free limbs have an at least partial toothing on their side facing away from the anchor, and therefore on the front outer side of the anchoring rail with respect to the longitudinal extent.

The anchoring rail can advantageously be used as part of a fastening system for securing a head screw within the anchoring rail to be fastened in concrete. The fastening system is advantageously characterized in that a latching plate having a toothing is provided, in that the latching plate is arranged between an object to be fastened and the free limbs of the anchoring rail, and in that the toothing of the latching plate points in the direction of the free limbs of the anchoring rail and engages in the toothing of the limbs when the object is fastened with the aid of a fastening nut.

BRIEF DESCRIPTION OF THE DRAWINGS

The invention will now be described with reference to the drawings wherein.

DESCRIPTION OF THE PREFERRED
EMBODIMENTS OF THE INVENTION

Figure 1:
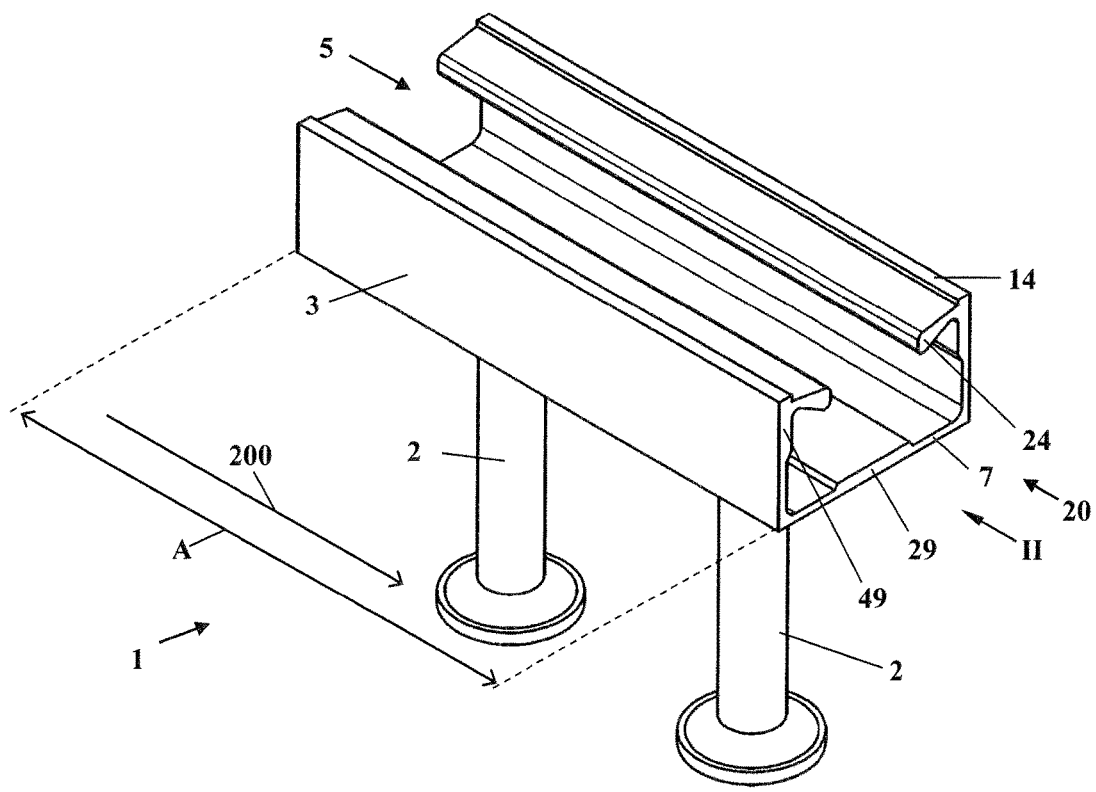
FIG. 1 shows a perspective view of an anchoring rail.

FIG. 1 shows the perspective view of an anchoring rail 1. Such anchoring rails are cast, for example, into concrete. The anchoring rail 1 has a substantially C-shaped cross section. Anchors 2 are provided for anchoring the anchoring rail 1 in the concrete. The anchors 2 are arranged orthogonally to a flat base 7. The anchors 2 are arranged in the center of the base 7 with respect to the direction transverse to the longitudinal direction 200 of the anchoring rail 1. Side walls 3 are arranged orthogonally to the base 7. The two side walls 3 run parallel to each other. The side walls 3 together with the base 7 form a base body 20 of the anchoring rail 1. The side walls 3 together with the base 7 form outer edges of the base body 20 of the anchoring rail 1. The base body 20 has a substantially U-shaped cross section. Free limbs 24 are arranged at the same height at that region of the side walls 3 which faces away from the base 7. The side walls 3 protrude over the free limbs 24. In the case of both side walls, that region of the side walls 3 which faces away from the anchors is bounded at the same height by the end faces 14 of the side walls 3.

Figure 2:
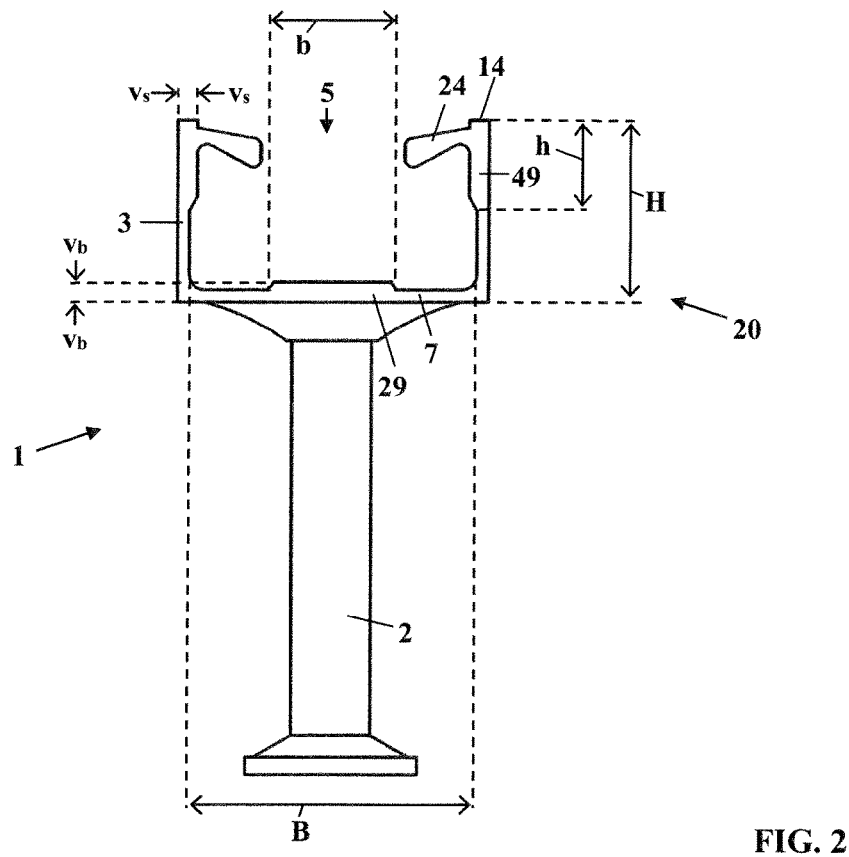
FIG. 2 shows a view of the anchoring rail from FIG. 1 in the direction of the arrow II in FIG. 1.

A slot 5 is formed in the longitudinal direction 200 of the anchoring rail 1 between the two opposite limbs 24. In a view of the anchoring rail 1 from a longitudinal end of the anchoring rail 1 in a direction counter to the longitudinal direction 200 shown in FIG. 1, the two limbs 24, as shown in FIG. 2, exhibit a hook-shaped profile. The wall thickness of the limbs 24 increases from the side walls 3 of the anchoring rail 1 towards the slot 5 of the anchoring rail 1. Those surfaces of the free limbs 24 which face away from the anchors 2 form an angle >270° with the side walls.

As can be seen in FIGS. 1 and 2, the base body 20 of the anchoring rail 1 has a base thickened portion 29 on the base 7. At the thickened point, the base 7 is thicker approximately by half than at unthickened points. The wall thickness $v_b$ of the base thickened portion 29, which wall thickness is shown in FIG. 2, is approximately 1.5 times the normal unthickened wall thickness of the base body 20 of the anchoring rail 1. The base thickened portion 29 is arranged on that side of the base 7 which faces away from the anchors 2. The base 7 has a width B which is identified in FIG. 2 and corresponds to the distance of the side walls 3, which lie opposite each other in parallel, in the transition region between base 7 and side walls 3. Transverse to the longitudinal direction 200 of the anchoring rail 1 and of the base 7, the base thickened portion 29 extends over a partial width (b) of the entire width B of the base 7. The partial width (b) is approximately half as large as the entire width B of the base 7. The base thickened portion 29 is arranged in the center between the side walls 3, which are opposite each other in parallel, and in the center of the base 7 with respect to the direction transverse to the longitudinal direction 200 of the anchoring rail 1. As FIG. 1 clarifies, the base thickened portion 29 extends over the entire longitudinal extent of the base 7.

FIGS. 1 and 2 show that the base body 20 of the anchoring rail 1 has side wall thickened portions 49 at the side walls 3. The wall thickness $v_s$ of the side wall thickened portion 49 corresponds to the wall thickness $v_b$ of the base thickened portion 29 and is therefore in turn approximately 1.5 times the wall thickness of the base body 20 in unthickened regions of the base body 20. As shown in FIG. 2, the side walls 3 have an overall height H. The overall height H of the side walls 3 is defined by the distance of the end side 14 of a side wall 3, which end side faces away from the anchors 2, from that side of the base 7 which faces the anchors 2. The side wall thickened portion 49 extends over part of the overall height H of a side wall 3. The side wall thickened portion 49 extends from the end side 14 of a side wall 3 to the base 7 of the anchoring rail 1 over a partial height (h) of the side wall 3. The partial height (h) of the side wall 3 corresponds approximately to half of the overall height H of the side wall 3. As FIG. 1 shows, the side wall thickened portion 49 extends over the entire longitudinal extent of a side wall 3. The side wall thickened portion 49 is arranged on the inner side of the side wall 3. The inner side of a side wall 3 faces the other side wall 3 which lies opposite in parallel.

Figure 3:
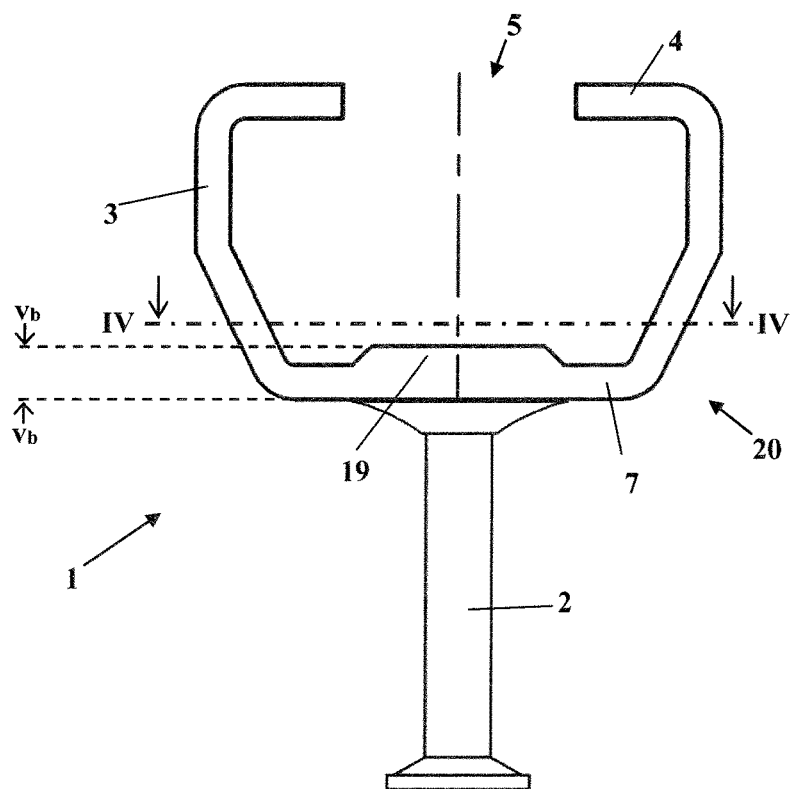
FIG. 3 shows a schematic view of an anchoring rail from a longitudinal end in the longitudinal direction of the anchoring rail.

FIG. 3 shows a view of an anchoring rail 1 from a longitudinal end of the anchoring rail 1 in the longitudinal direction of the anchoring rail 1. The anchoring rail 1 includes a base body 20 having side walls 3 and base 7. The side walls 3 have a band approximately at half the height of the side walls 3. In the region of the transition between side walls 3 and base 7, the side walls 3 and the base 7 enclose an angle >90°. In that region of the side walls 3 which is further away from the base 7, the side walls 3 are oriented orthogonally to the base 7. At the region of the side walls 3 that is further away from the base 7, free limbs 4 adjoin the side walls 3. The free limbs 4 are oriented orthogonally to that region of the side walls 3 which is further away from the base 7. The mutually opposite free limbs 4 lie in a common plane. The free limbs 4 are arranged parallel to the base 7. A slot 5 is formed between the free limbs 4.

Figure 4:
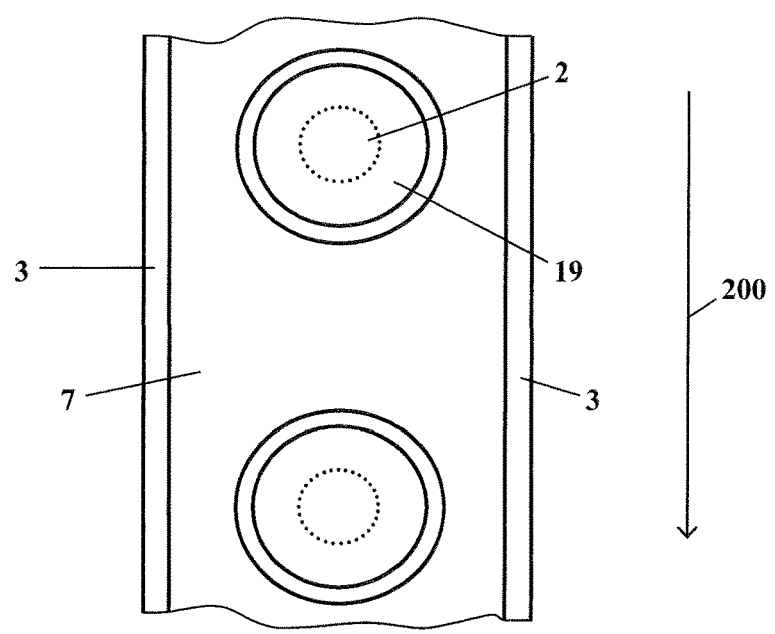
FIG. 4 shows a partial schematic of a section of the anchoring rail from FIG. 3 along the line IV-IV in FIG. 3.
Figure 5:
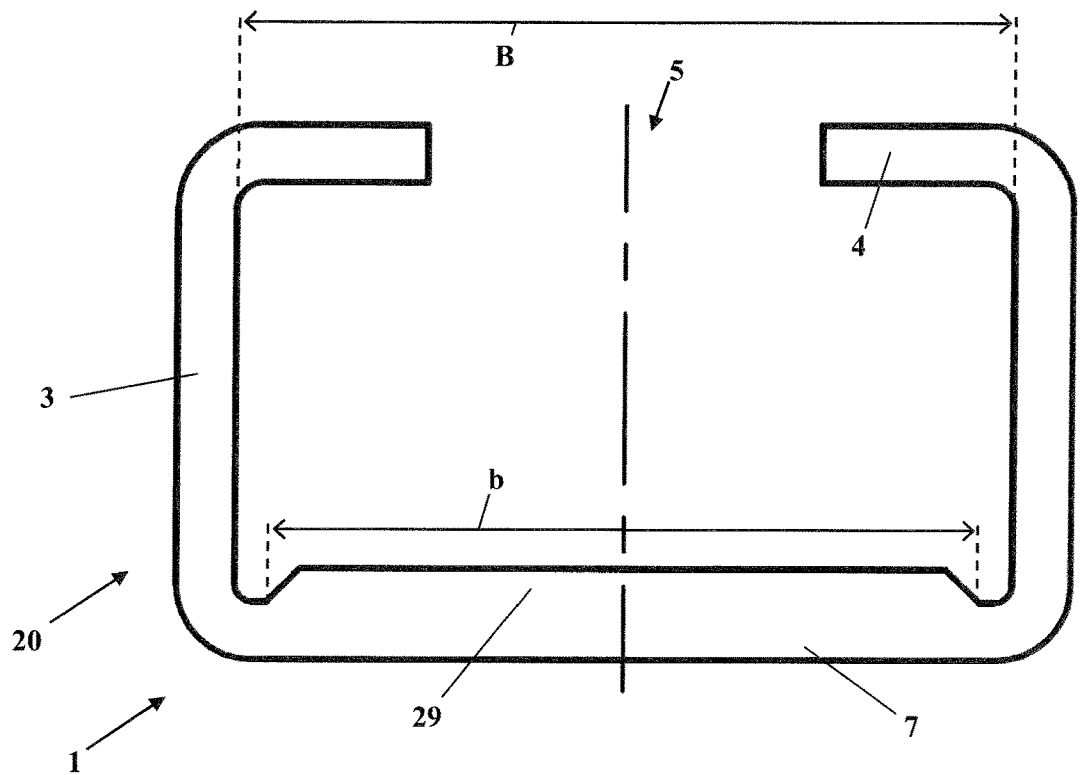
FIGS. 5 to 13 show schematic partial illustrations of views of anchoring rails from a longitudinal end in the longitudinal direction of the respective anchoring rail without the anchors being shown.

The base 7 of the anchoring rail 1 has a thickened portion which is configured as a base thickened portion 19. The base thickened portion 19 is arranged in the region of the anchor 2. This is clarified by FIG. 4 which shows a schematic partial view of a section of the anchoring rail from FIG. 3 along the line IV-IV from FIG. 3. The anchor 2 is also shown with a dashed line in FIG. 4. The anchor 2 cannot be seen in reality in this view of the anchoring rail 1. The dashed line assigned to the anchor 2 in FIG. 4 shows the main diameter of the anchor 2 transverse to the longitudinal direction of the anchor 2. The main diameter of the anchor 2 can be measured, for example, to half the height of the anchor 2 with respect to the longitudinal direction of the anchor 2. That region of the base 7 which is thickened by a base thickened portion 19 is more than twice as large as the cross-sectional area of the anchor 2 that is shown by the dashed line. FIG. 4 merely shows a partial cutout of the anchoring rail 1. A plurality of base thickened portions 19 are arranged at regular distances from one another in the longitudinal direction 200 of the anchoring rail 1. As can be seen in FIG. 3, the base thickened portion 19 merges in a flowing manner from the thickened region of the base 7 into the unthickened region of the base 7. In the transition region, the base thickened portion 19 has a slope encircling in a circular manner. The wall thickness $v_b$ of the base 7 in the region of the base thickened portion 19 is approximately 1.5 times the wall thickness of the base 7 in the unthickened region of the base 7.

FIGS. 5 to 13 show schematic partial illustrations of views of anchoring rails 1 from a longitudinal end in the longitudinal direction of the respective anchoring rail 1. The anchor has not been illustrated in FIGS. 5 to 13. All of the anchoring rails 1 shown in FIGS. 5 to 13 have a substantially C-shaped cross section. In all of the figures, the same reference signs refer to corresponding parts of the various anchoring rails 1 or fastening systems. The outer sides of all of the bases 7 of the anchoring rails 1 in FIGS. 5 to 13 are of flat configuration. Outer sides of the bases 7 refer to those sides of the bases 7 which face the anchors 2 (not shown in FIGS. 5 to 13) and which face away from the free limbs (4, 24) opposite the bases 7. The inner sides of the bases 7 lie opposite the outer sides of the bases 7. The inner sides of the bases 7 of the anchoring rails according to FIGS. 9, 10, 11, 12 and 13 are of flat configuration.

In the case of the anchoring rails 1 according to FIGS. 5, 6, 8, 9, 10, 11, 12 and 13, opposite side walls 3 with the exception of the transitions between thickened and unthickened regions are arranged exclusively orthogonally to the base 7. The side walls 3 form outer edges with the base 7. In the case of the anchoring rail 1 according to FIG. 7, the two side walls 3 are of flat configuration and enclose an angle >90° with the base 7.

The free limbs (4, 34) of the anchoring rails 1 according to FIGS. 5, 6, 7, 8, 9, 11 and 13 have an invariable, identical wall thickness in the course from the side walls 3 to the slot 5. For the anchoring rails 1 according to FIGS. 5, 6, 7, 8, 11, 12 and 13, the free limbs 4 run parallel to the flat outer sides of the bases 7. For all of the embodiments according to FIGS. 5 to 13, the mutually opposite free limbs (4, 24, 34) are arranged at an identical height at that region of the side walls 3 which faces the base 7 or that region of the side walls 3 which faces away from the anchor (not shown). The free limbs 4 of the anchoring rails 1 according to the embodiments according to FIGS. 5, 6, 8, 11, 12 and 13 are arranged perpendicular to the side walls 3. Those surfaces of the limbs (4, 24) of the anchoring rails 1 that face away from the anchors (not shown) and the bases 7 according to the embodiments according to FIGS. 5, 6, 7, 8, 10, 11, 12 and 13 lie in the same plane.

Figure 9:
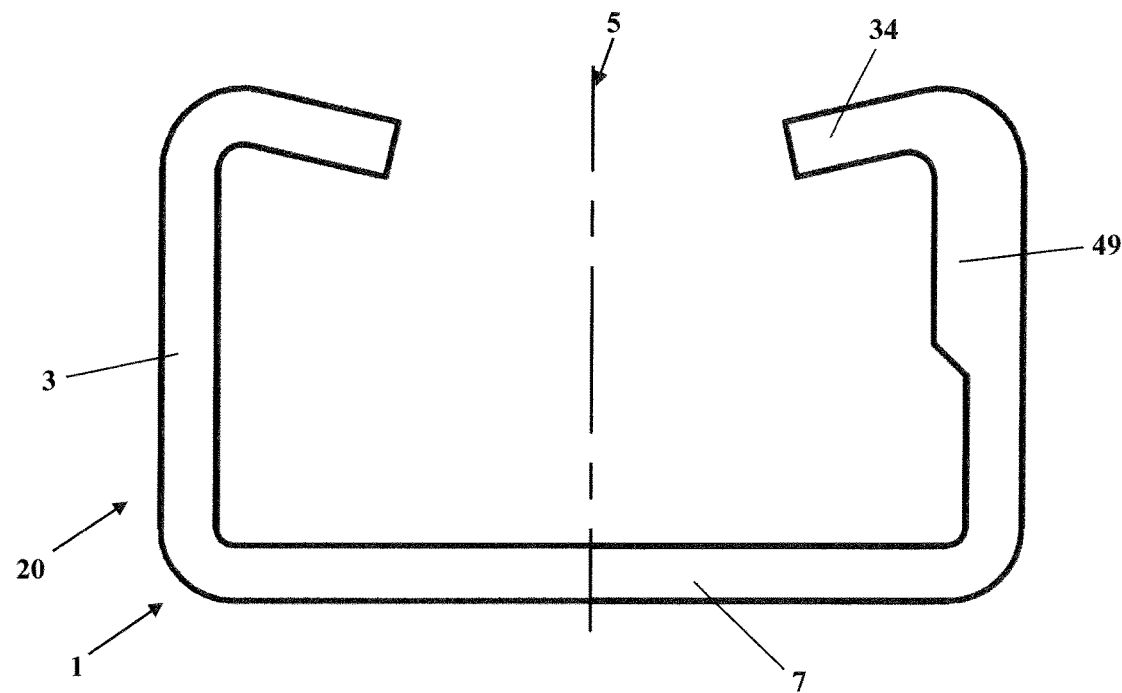
Figure 10:
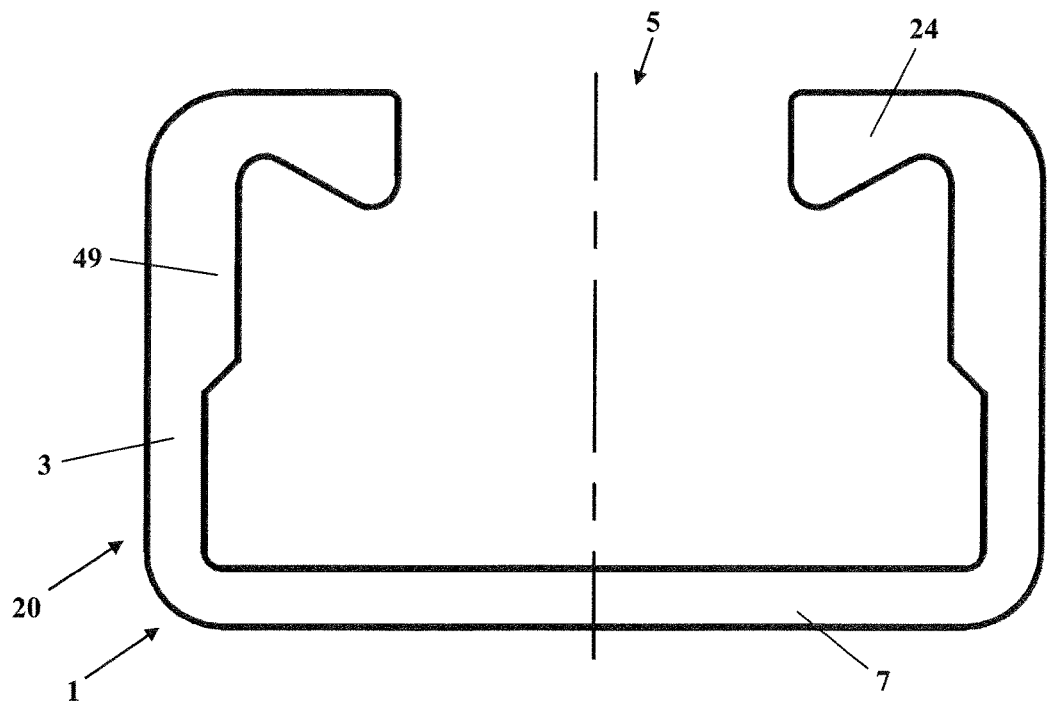
Figure 11:
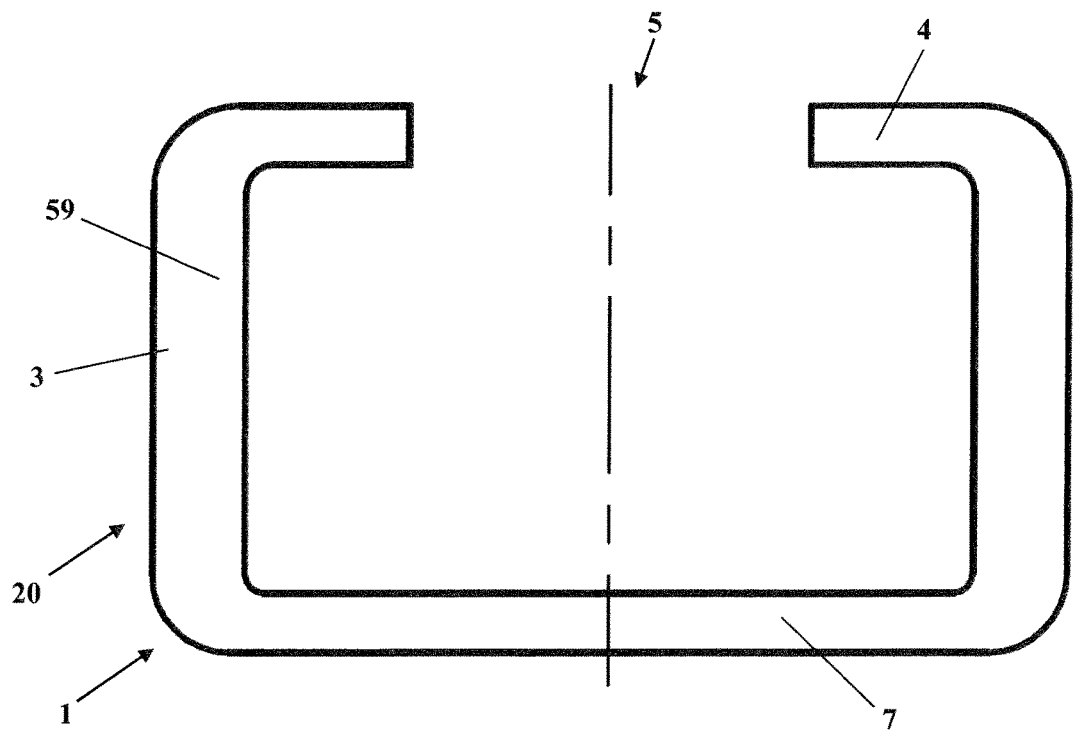

The wall thickness of the limbs 24 of the anchoring rail 1 according to FIG. 10 increases from the side walls 3 of the anchoring rail 1 toward the slot 5 in the anchoring rail 1. The free limbs 34 of the anchoring rail 1 according to FIG. 9 are bent inward; the free limbs 34 form an angle of <90° with the side walls 3. The distance between the region of the free limbs 34, which region lies closer to the slot 5 in the anchoring rails 1, and the base 7 is smaller than the distance between the region of the free limbs 34, which region lies closer to the side walls 3, and the base 7.

All of the anchoring rails 1 according to FIGS. 5 to 13 have at least one thickened portion on the basic bodies 20 thereof. The anchoring rails 1 according to FIGS. 5 to 8 and 12 and 13 have thickened portions on the base 7. The base thickened portion 29 of the anchoring rail 1 according to FIG. 5 extends over a partial width (b) of the entire width B of the base 7 of the anchoring rail 1. The entire width B of the base 7 is the width of the base 7 transverse to the longitudinal direction 200 of the anchoring rail 1. The wall thickness of the base 7 in the region of the base thickened portion 29 is approximately 1.7 times the wall thickness of the base 7 in the unthickened region. The base thickened portion 29 extends along the entire longitudinal extent (not shown) of the anchoring rail 1 from FIG. 5.

The anchoring rails 1 according to FIGS. 6, 7, 8, 12 and 13 have base thickened portions 39 of the bases 7 that extend over the entire width B of the base 7. The base thickened portions 39 also extend over the entire longitudinal extent (not shown) of the corresponding anchoring rails 1.

Figure 6:
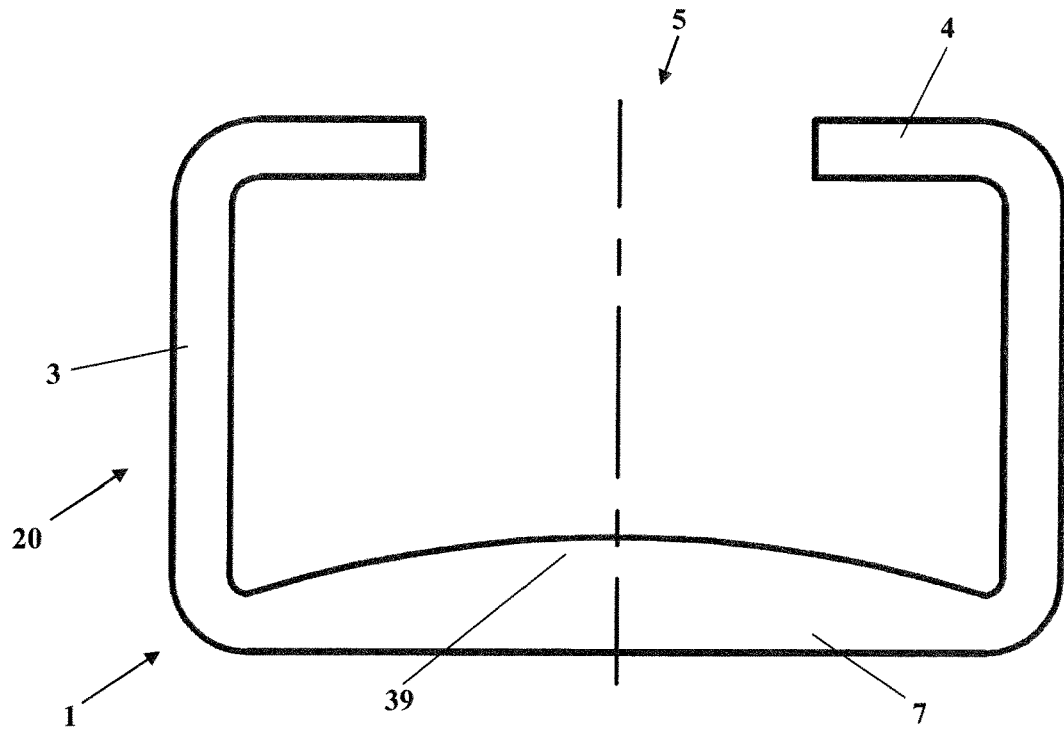
Figure 7:
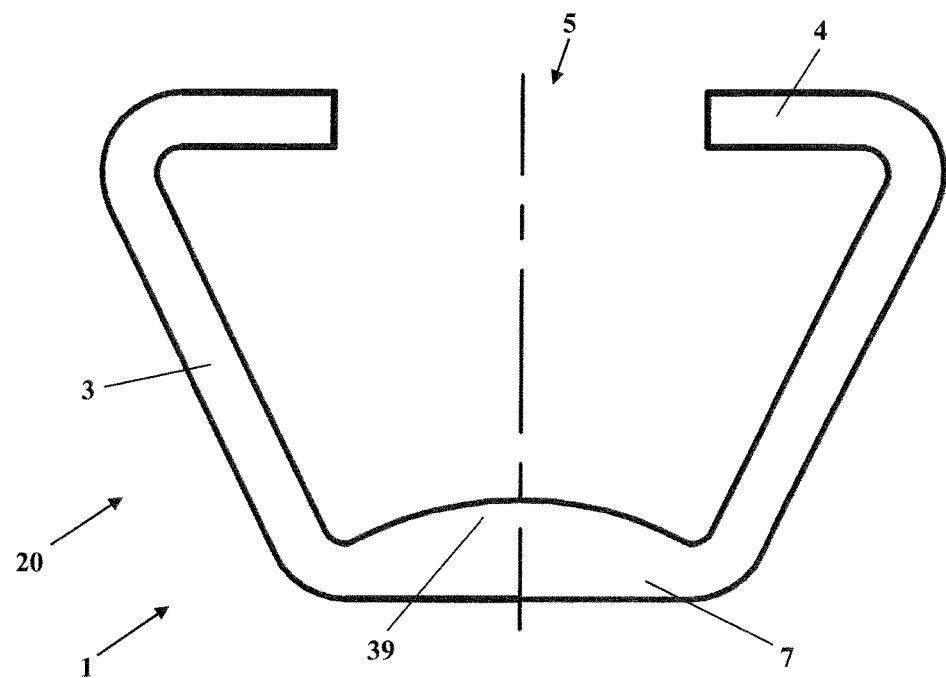
Figure 8:
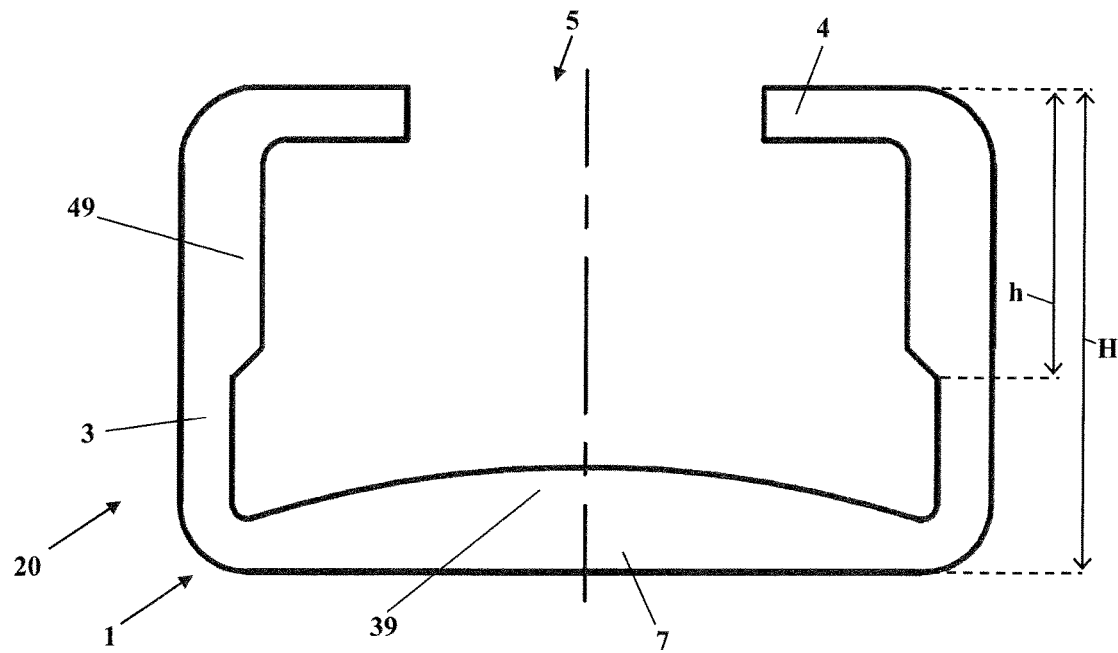

The base thickened portions 39 of the bases 7 of the anchoring rails 1 according to FIGS. 6 to 8 are formed in an arched manner on the inner sides of the bases 7, which inner sides face the limbs 4. The wall thickness of the bases 7 is of thicker configuration, via the base thickened portion 39, in the center of the bases 7 with respect to the direction transverse to the longitudinal direction (not shown) of the anchoring rail 1 than in the edge regions of the bases 7 close to the side walls 3. The wall thicknesses of the bases 7 in the region of the greatest thickness of the base thickened portion 39, that is, in the center between the opposite side walls 3, are approximately twice the wall thicknesses of the corresponding base body 20 in unthickened regions. In the embodiments according to FIGS. 6 to 8, the thickened portion of the bases 7 by means of the base thickened portions 39 in the regions in the vicinity of the side walls 3 is minimal and is approximately 1/20 of the wall thickness of the corresponding base body 20 in unthickened regions. The wall thickness of the bases 7 changes from the thickest region of the base thickened portions 39 continuously in an arc-like, curved shape toward the regions with the smallest base thickened portions 39.

Figure 12:
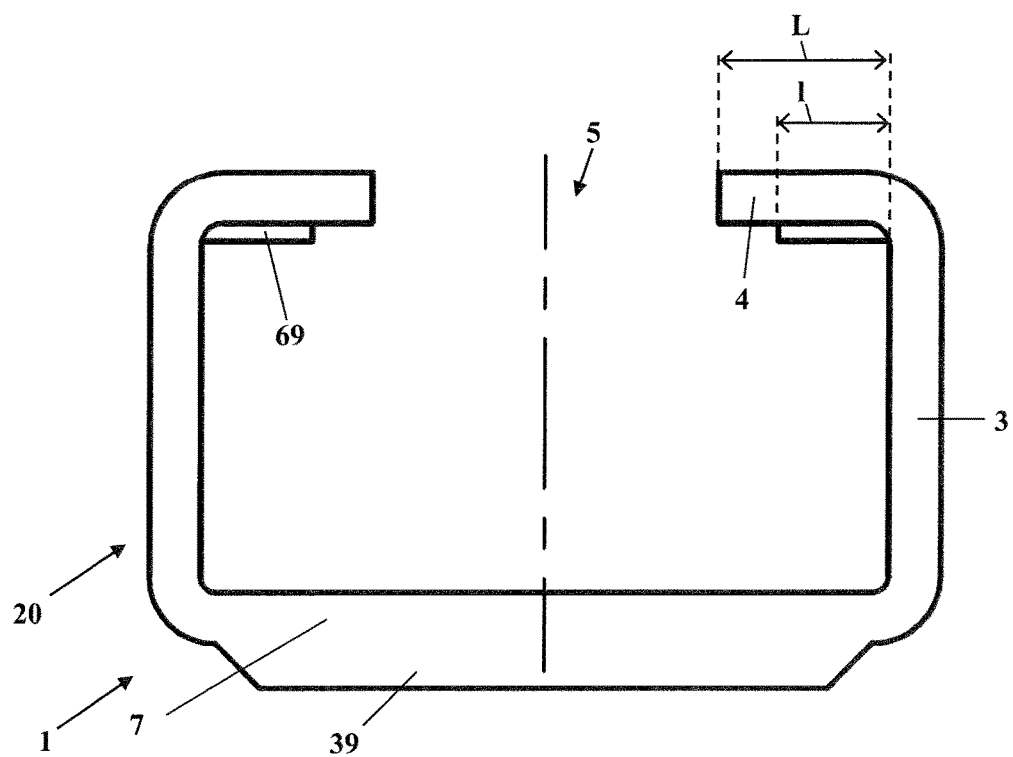
Figure 13:
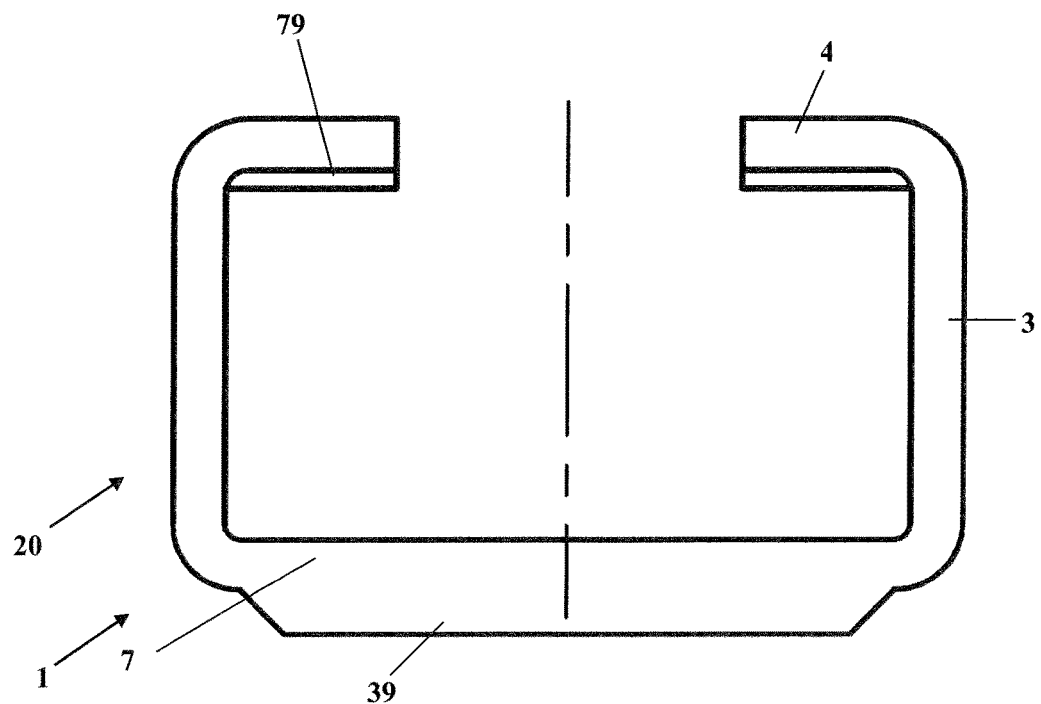

The base thickened portions 39 according to the embodiments from FIGS. 12 and 13 are arranged on the outer sides of the bases 7 of the corresponding anchoring rail 1, which outer sides face away from the free limbs 4. Via the base thickened portions 39, the wall thicknesses of the bases 7 in FIGS. 12 and 13 are twice as thick, virtually over the entire width B of the bases 7, as the wall thickness of the respective base body 20 in unthickened regions of the basic bodies 20. Only in the edge regions of the base thickened portions 39, in the vicinity of the side walls 3, are the base thickened portions 39 slightly beveled. As a result, a virtually flowing transition is produced between that region of the base 7 which is thickened by the base thickened portion 39 and the unthickened transition region between base 7 and side walls 3.

The anchoring rails 1 according to FIGS. 8 to 11 have side wall thickened portions (49, 59) on the side walls 3 thereof. The side wall thickened portions 49 of the side walls 3 of the anchoring rails from FIGS. 8 to 10 extend merely over a partial height (h) of the side walls 3. The side wall thickened portion 59 of the anchoring rail 1 from FIG. 11 extends over the entire height H of the side wall 3. The entire height H of a side wall 3 is the height of a side wall 3 transverse to the longitudinal direction thereof and is measured in the direction of the anchor 2. The longitudinal direction of the side wall 3 points in the same direction as the longitudinal direction 200 of the anchoring rail 1. All of the side wall thickened portions (49, 59) extend over the entire longitudinal extent (not shown) of the anchoring rails 1 according to FIGS. 8 to 11. The wall thickness of the side walls 3 in those regions of the anchoring rails 1 which are thickened by side wall thickened portions (49, 59) is, according to FIGS. 8 to 11, twice as thick as in unthickened regions of the corresponding base bodies 20. The wall thickened portions 49 according to FIGS. 8 to 10, which wall thickened portions extend merely over a partial height (h) of the respective side walls 3, extend from the free limbs (4, 24, 34) in the direction toward the bases 7 and are arranged on the mutually facing inner sides of the side walls 3. The partial heights (h) of the side walls 3, which partial heights are thickened by the side wall thickened portions 49, correspond approximately to half of the overall heights H of the side walls 3 of the anchoring rails 1 from FIGS. 8 to 10.

The free limbs 4 of the anchoring rails 1 according to FIGS. 12 and 13 have limb thickened portions (69, 79) on the inner sides thereof facing the bases 7. For the two embodiments, the limb thickened portions (69, 79) extend over the entire longitudinal extent (not shown) of the corresponding anchoring rails 1. The wall thickness of the free limbs 4 in the region of the side wall thickened portions (69, 79) is approximately 1.3 times the wall thickness of the corresponding base bodies 20 of the respective anchoring rail 1. The width L of a free limb 4 is shown in FIG. 12. The width L corresponds to the extension of the free limb 4 from the connecting point of a side wall 3 as far as the closest edge of the slot 5 of the anchoring rail 1. The limb thickened portion 79 of the anchoring rail 1 according to FIG. 13 extends over the entire width L of the associated free limb 4. The limb thickened portion 69 of the free limbs 4 of the anchoring rail 1 according to FIG. 12 extends merely over a partial width 1 of the entire width L of the free limbs 4. The limb thickened portion 69 of the free limbs 4 of the anchoring rail 1 according to FIG. 12 extends from the transition between the associated side wall 3 and the corresponding free limb 4 in the direction toward the slot 5 of the anchoring rail 1 over the partial width (l) of the free limb 4. The partial width (l) of the free limb 4, over which the limb thickened portion 69 extends, is approximately two thirds of the entire width L of a free limb 4.

Figure 14:
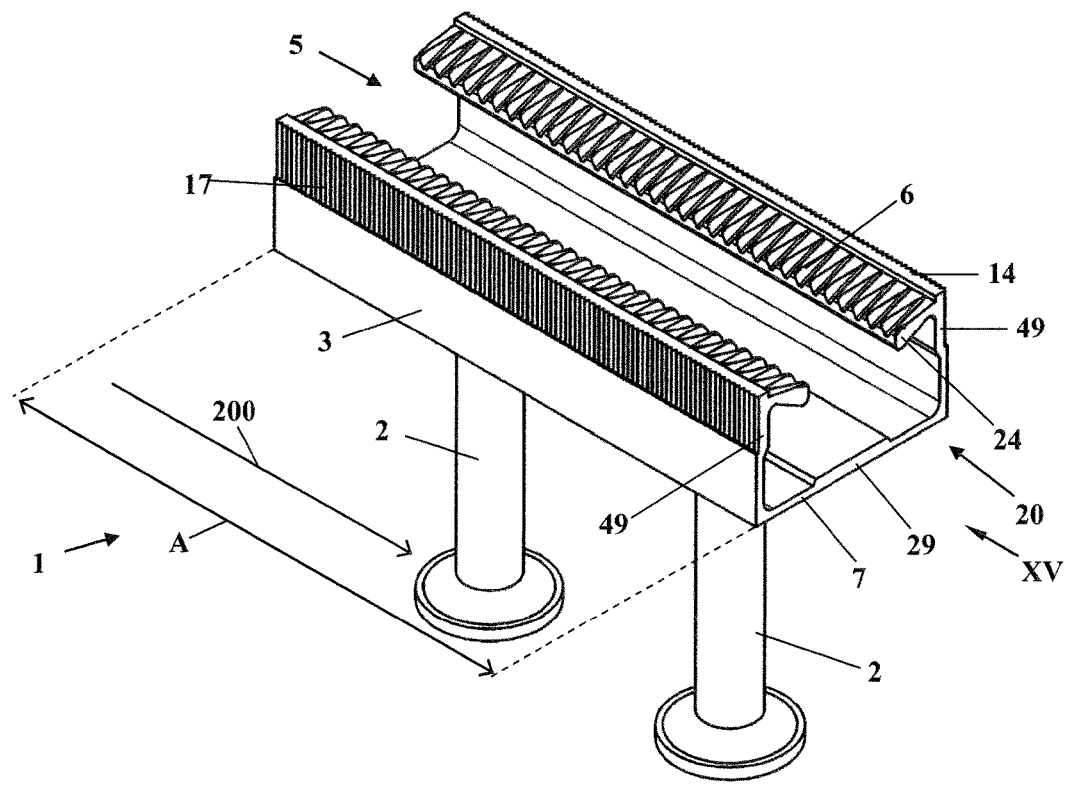
FIG. 14 shows a perspective view of an anchoring rail.

FIG. 14 shows the perspective view of an anchoring rail 1. Anchors 2 are provided for anchoring the anchoring rail 1 in the concrete. The anchors 2 are arranged orthogonally to a flat base 7. The anchors 2 are arranged in the center of the base 7 with respect to the direction transverse to the longitudinal direction 200 of the anchoring rail 1. Two side walls 3 are arranged orthogonally to the base 7 of the anchoring rail 1. The two side walls 3 run parallel to each other. The side walls 3 together with the base 7 form outer edges of the base body 20 of the anchoring rail 1. The base body 20 includes the base 7 and the two side walls 3. Free limbs 24 are arranged at the same height at that region of the side walls 3 which faces away from the base 7. The side walls 3 extend above the free limbs 24. That region of the side walls 3 which faces away from the anchors 2 is limited to the same height in the case of both side walls 3 by the end faces 14 of the side walls 3.

A slot 5 is formed in the longitudinal direction 200 of the anchoring rail 1 between the two mutually opposite limbs 24. In a cross section transverse to the longitudinal direction 200 of the anchoring rail 1, the two limbs 24 exhibit a hook shaped profile. The wall thickness of the limbs 24 increases from the side walls 3 of the anchoring wall 1 toward the slot 5 of the anchoring rail 1. Those surfaces of the free limbs 24 which face away from the anchors 2 form an angle >270° with the side walls. Those surfaces of the free limbs 24 which face away from the anchors are provided with a toothing 6. The toothing 6 of the free limbs 24 is oriented transversely to the longitudinal direction 200 of the anchoring rail 1. That side of the limbs 24 which faces away from the anchors 2 is also referred to as the front outer side of the anchoring rail 1. With respect to the longitudinal extension A, the free limbs 24 have a continuous toothing 6 on the front outer side of the anchoring rail 1. The toothing 6 of the outer sides of the limbs 24 extends from the slot 5 in the anchoring rail 1 approximately as far as the planes in which the inner walls of the side walls 3 also lie.

Figure 15:
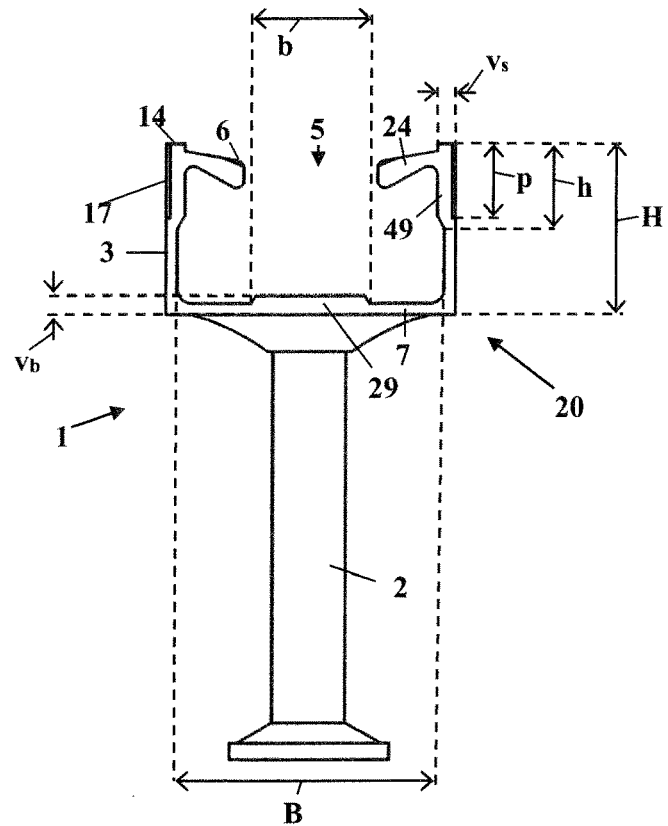
FIG. 15 shows a view of the anchoring rail from FIG. 14 from a longitudinal end of the anchoring rail in the direction of the arrow XV in FIG. 14.

FIG. 15 shows a view of the anchoring rail 1 from FIG. 14 from a longitudinal end of the anchoring rail 1 in the direction of the arrow which is indicated by XV in FIG. 14, that is, counter to the longitudinal direction 200, which is indicated in FIG. 14, of the anchoring rail 1. As can be seen in FIGS. 14 and 15, the base body 20 of the anchoring rail 1 has a base thickened portion 29 on the base 7. At the thickened point, the base 7 is approximately thicker by half than at unthickened points. The wall thickness $v_b$ (shown in FIG. 15) of the base 7 of the base body 20 in the region of the base thickened portion 29 is approximately 1.5 times the normal unthickened wall thickness of the base body 20 of the anchoring rail 1. The base thickened portion 29 is arranged on that side of the base 7 which faces away from the anchors 2. The base 7 has a width B which is identified in FIG. 15 and corresponds to the distance of the side walls 3, which are opposite each other in parallel, in the transition region between base 7 and side walls 3. Transverse to the longitudinal direction 200 of the anchoring rail 1 and of the base 7, the base thickened portion 29 extends over a partial width (b) of the entire width B of the base 7. The partial width (b) is approximately half as large as the entire width B of the base 7. The base thickened portion 29 is arranged in the center between the side walls 3, which lie opposite each other in parallel, and in the center of the base 7 with respect to the direction transverse to the longitudinal direction 200 of the anchoring rail 1. As FIG. 14 clarifies, the base thickened portion 29 extends over the entire longitudinal extent A of the base 7.

FIGS. 14 and 15 show that the base body 20 of the anchoring rail 1 has side wall thickened portions 49 at the side walls 3. The wall thickness $v_s$ of the side wall thickened portion 49 corresponds to the wall thickness $v_b$ of the base thickened portion 29 and is therefore in turn approximately 1.5 times the wall thickness of the base body 20 in unthickened regions. As shown in FIG. 15, the side walls 3 have an overall height H. The overall height H of the side walls 3 is defined via the distance of the end side 14 of a side wall 3, which end side faces away from the anchors 2, to that side of the base 7 which faces the anchors 2. The side wall thickened portion 49 extends over part of the overall height H of a side wall 3. The side wall thickened portion 49 extends from the end side 14 of a side wall 3 toward the base 7 of the anchoring rail 1 over a partial height (h) of the side wall 3. The partial height (h) of the side wall 3 corresponds to approximately half of the overall height H of the side wall 3. As FIG. 14 shows, the side wall thickened portion 49 extends over the entire longitudinal extent A of a side wall 3. The side wall thickened portion 49 is arranged on an inner side of the side wall 3. The inner side of a side wall 3 faces the other side wall 3, which lies opposite in parallel.

A profiling in the form of side wall profiling 17 is arranged on the outer sides of the side walls 3. The side wall profiling 17 extends over the partial height (p), which is shown in FIG. 15, of the overall height H of a side wall 3. The partial height (p) is somewhat less than half of the overall height H of the side wall 3 and therefore somewhat less than the partial height (h) over which the side wall thickened portion 49 extends.

In the direction of the longitudinal direction 200 of the anchoring rail 1, the side wall profilings 17 extend over the entire length A of the longitudinal extent of the anchoring rail 1. The side wall profilings 17 include grooves which are arranged parallel to one another and which are introduced into the outwardly directed surfaces of the side walls 3 of the anchoring rail 1. As can be seen in FIG. 15, the side walls 3 are thickened in the region of the side wall profilings 17 with the side wall thickened portions 49. The wall thickness of the side walls 3 in the region of the side wall thickened portion 49 is approximately 1.5 times the wall thickness of the base body 20 in unthickened regions and is identified by $v_s$ in FIG. 15. The depth of the grooves of the side wall profiling 17, which grooves are introduced into the side walls for profiling purposes, is approximately a quarter of the wall thickness $v_s$ of the side walls 3 of the base body 20 in the regions thickened by the side wall thickened portions 49. The side wall profilings 17 do not protrude over the flat surfaces of the side walls 3.

It can be seen in FIG. 15 that the toothing 6 of the limbs 24 in that region of the limbs 24 which is adjacent to the slot 5 is deeper than in that region of the limbs 24 which is further away from the slot 5. The length of the anchor 2 in the longitudinal direction thereof is more than twice as much as the height H of the side walls 3. The height H of the side walls 3 extends in the longitudinal direction of the anchor 2. The distance between the two side walls 3 running parallel to each other is approximately twice as much in the region of the transition between base 7 and side walls 3 than the width of the slot 5 and corresponds to the width B of the base 7. The width of the slot 5 here is the smallest distance between the two opposite limbs 24.

Figure 16:
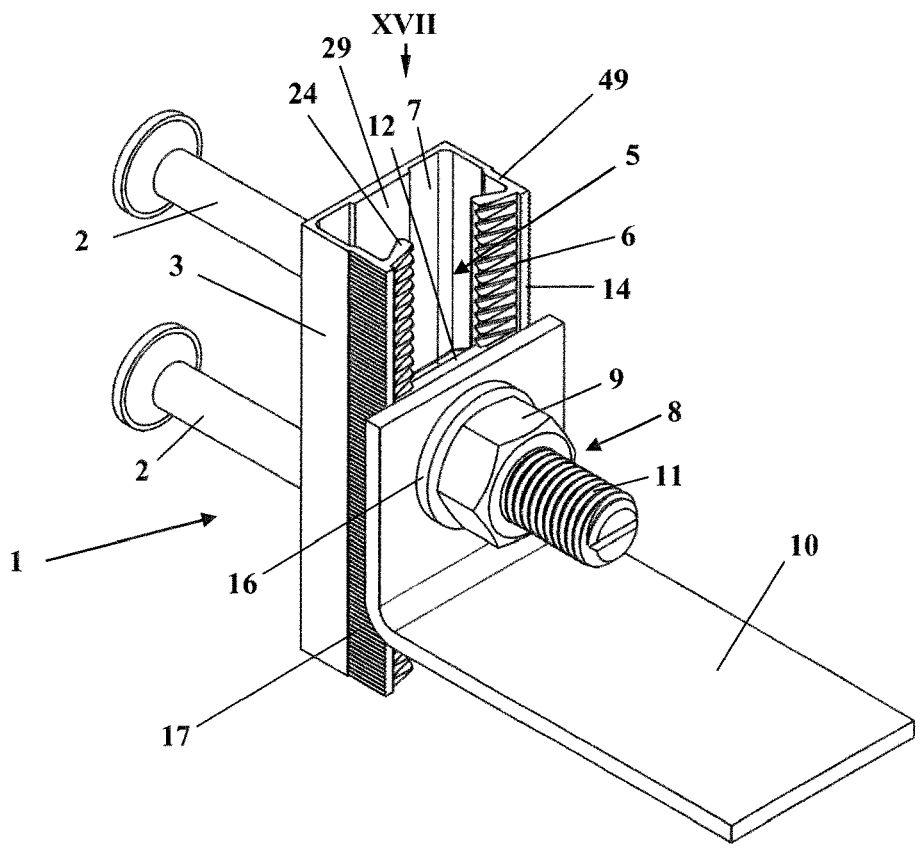
FIG. 16 shows a perspective view of a fastening system, including the anchoring rail from FIG. 14.
Figure 17:
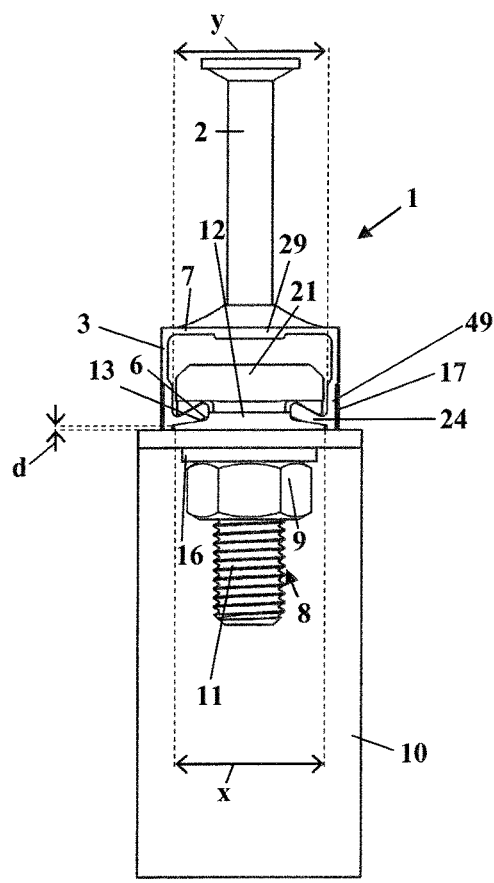
FIG. 17 shows a view of the fastening system from FIG. 16 from a longitudinal end of the anchoring rail in the direction of the arrow XVII in FIG. 16; and, FIG. 18 shows an exploded view of the fastening system from FIGS. 16 and 17.
Figure 18:
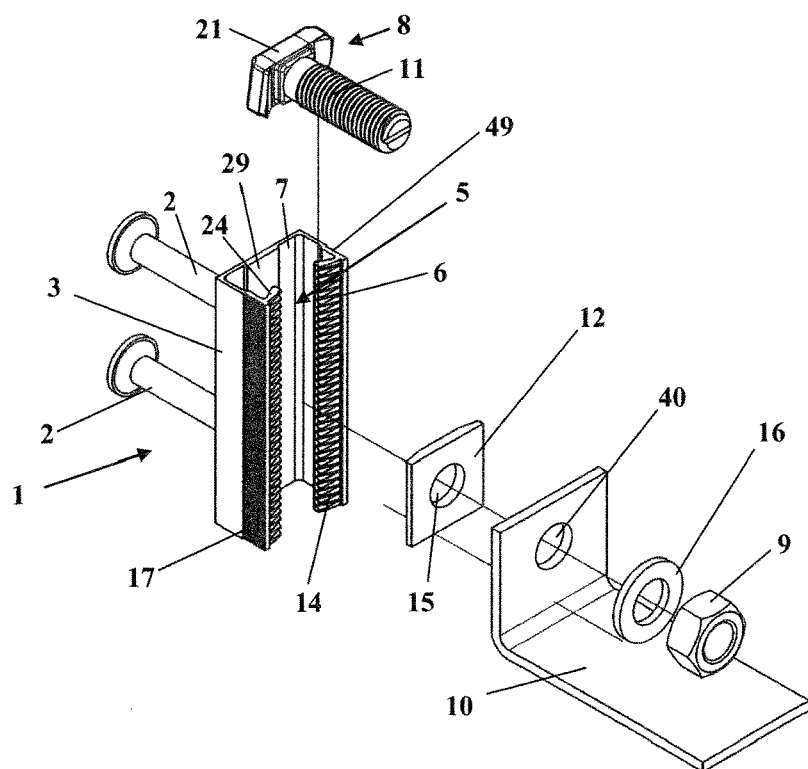

FIG. 16 shows the perspective view of a fastening system for securing a head screw 8 within an anchoring rail 1 to be fastened in concrete. FIG. 17 shows a view of the fastening system from FIG. 16 from a longitudinal end of the anchoring rail 1 in the direction of the arrow identified by XVII in FIG. 16, that is, in the longitudinal direction of the anchoring rail 1. FIG. 18 shows an exploded view of the fastening system shown in FIGS. 16 and 17. In FIGS. 16, 17 and 18, the anchoring rail 1 corresponds to the anchoring rail shown in FIG. 14. An object 10 is fastened to the anchoring rail 1 with the aid of the head screw 8. The head screw 8 includes a head 21 with which the head screw is held in the anchoring rail 1. The head 21 of the head screw 8 engages here behind the limbs 24 of the anchoring rail 1. The head screw 8 is typically a hammer head screw. For the introduction of the head 21 of the hammer head screw, the longitudinal direction of the hammer head is aligned parallel to the longitudinal direction 200 of the anchoring rail 1 such that the head 21 of the hammer head screw can be plugged through the slot 5 in the anchoring rail 1. Subsequently, the head 21 of the hammer head screw is rotated through 90° about the longitudinal axis of the threaded shank 11 of the hammer head screw such that removal of the hammer head screw from the rail of the anchoring rail 1 solely by moving the hammer head screw in a direction away from the anchors 2 to the anchoring rail 1 is not possible. Such a movement is stopped by those surfaces of the head 21 of the hammer head screw that face the threaded shank of the hammer head screw stopping against the inner-side surfaces of the free limbs 24, which surfaces face the anchors 2 of the anchoring rail 1. In the described position of the hammer head screw, the threaded shank 11 of the hammer head screw protrudes out of the anchoring rail 1 from the slot 5 in the anchoring rail 1 in a direction parallel to the anchors 2. The position of the head screw 8 in the longitudinal direction 200 of the anchoring rail 1 is secured with the aid of a latching plate 12. As can be seen in FIG. 18, the latching plate 12 has a through opening 15. The diameter of the through opening 15 is matched to the diameter of the threaded shank 11 of the head screw 8. The threaded shank 11 of the head screw 8 can be inserted through the through opening 15 in the latching plate 12. The latching plate 12 has two opposite surfaces through which the through opening 15 leads. One of the two surfaces is of a flat configuration. The other of the two surfaces has a toothing 13 (FIG. 17) which corresponds with the toothing 6 of the anchoring rail 1. As shown in FIG. 17, in order to secure the head screw 8, which is located in the rail of the anchoring rail 1, the threaded shank 11 of the head screw 8 is plugged through the through opening 15 in the latching plate 12. In the process, the latching plate 12 is brought onto the threaded shank 11 of the head screw 8 in such a manner that that surface of the latching plate 12 which has the toothing 13 points in the direction of the anchors 2 of the anchoring rail 1. The teeth of the toothings 13 of the latching plate 12 and of the toothings 6 of the free limbs 24 of the anchoring rail 1 intermesh when securing the head screw 8 with the aid of the latching plate 12. In this case, the untoothed surface of the latching plate 12, which surface faces away from the anchors 2, forms a plane with the end faces 14 of the side walls 3 of the anchoring rail 1. For this purpose, the side walls 3 of the anchoring rail 1 protrude over the free limbs 24 by the thickness (d). The thickness (d) is the thickness of the two mutually opposite edges of the latching plate 12, which edges run in the longitudinal direction 200 of the anchoring rail 1 when the latching plate 12 is positioned on the free limbs 24 of the anchoring rail 1. As shown in FIG. 17, the side edges of the latching plate 12 end flush with the side walls 3 of the anchoring rail 1.

In this embodiment, the latching plate is of rectangular configuration, and the distance between the mutually opposite side edges of the latching plate 12 that run parallel to each other is referred to as width (x). The width (x) of the latching plate 12 corresponds to the distance (y) between the inner sides of the side walls 3 of the anchoring rail 1 at the elevation of the limbs 24 arranged on the side walls 3. As shown in FIG. 17, the end faces 14 of the side walls 3 and the latching plate 12 thus form a flush, flat surface. An object 10 to be fastened can be mounted onto the plane.

An object 10 to be fastened has to have an opening 40, which is shown in FIG. 18, through which the threaded shank 11 can be plugged or into which the threaded shank 11 can be screwed. In FIG. 16, the threaded shank 11 of the head screw 8 is plugged through such an opening 40 in a fastened object 10 and secures the head screw 8 in the anchoring rail 1 with the aid of a disk spring 16 and a fastening nut 9. The use of a washer instead of a disk spring may also be provided. For this purpose, the fastening nut 9 is screwed onto the threaded shank 11 of the head screw 8. When the fastening nut 9 is screwed tight, those surfaces of the head 21 of the head screw 8 which face the threaded shank 11 are pressed against the inner surfaces of the free limbs 24, which inner surfaces face the anchors 2. At the same time, the latching plate 12 is pressed against the free limbs 24 of the anchoring rail 1. As shown in FIG. 17, in the process the teeth of the toothings 13 of the latching plate 12 grip in the teeth of the toothing 6 of the free limbs 24 of the anchoring rail 1. The position of the head screw 8 is thus finally secured in the anchoring rail 1. At the same time, the object 10 is fastened to the anchoring rail 1. As can be seen in FIGS. 16 to 18, the latching plate 12 is arranged here between the object 10 to be fastened and the free limbs 24 of the anchoring rail 1. The latching plate 12 and the toothings 13 of the latching plate 12 are matched to the angular position of the free limbs 24 and to the toothing 6 of the free limbs 24 in such a manner that, when fastening the object 10 with the aid of the head screw 8 and the fastening nut 9, virtually the entire surface of the latching plate 12, which surface faces the anchor 2 of the anchoring rail 1, rests in a form fitting manner on the limbs 24 of the anchoring rail 1.

The anchoring rail 1 shown in FIGS. 16 to 18 can be configured in accordance with each of the anchoring rails shown in the preceding FIGS. 1 to 15. Provision may be made here for the shape of the latching plate 12 to be matched to the shape of the limbs (4, 24, 34) of the anchoring rail 1. In particular, the shape of the toothing 13 of the latching plate 12 can be matched to the shape of the toothing of the free limbs (4, 24, 34) of the anchoring rail. Provision may be made here for the two components to intermesh in a form-fitting manner at the contact surface thereof. However, provision may also be made for the teeth of the toothings of the latching plate and the teeth of the toothings of the limbs of the anchoring rail merely to be formed in such a manner that they intermesh forming cavities. Furthermore, provision may be made for the shape of the latching plate 12 to be matched to any desired angular position of the free limbs (4, 24, 34) in such a manner that, when an object 10 is fastened with the aid of a head screw 8 and a fastening nut 9, the latching plate 12 rests in a form-fitting manner on the limbs (4, 24, 34) of the anchoring rail 1.

It is understood that the foregoing description is that of the preferred embodiments of the invention and that various changes and modifications may be made thereto without departing from the spirit and scope of the invention as defined in the appended claims.

What is claimed is:

1. An anchoring rail for anchoring in concrete, the anchoring rail defining a longitudinal direction, the anchoring rail comprising:
    an assembly group; and
    at least one anchor;
    said assembly group exclusively consisting of a base body and a first and a second free limb;
    said assembly group defining exclusively a substantially C-shaped cross section;
    said base body exclusively consisting of a base and a first and a second side wall;
    said base having an outer side;
    said base being planar on said outer side;

said first and second side walls and said base conjointly defining respective first and second outer edges;

said first and said second free limbs being arranged opposite said base of said base body;

said at least one anchor being mounted directly on said base at a location centered thereon with respect to a direction transverse to said longitudinal direction;

said at least one anchor being connected directly with said base for fixating directly thereto;

said first and said second free limbs conjointly defining a slot therebetween extending in said longitudinal direction;

said base body having a base thickening formed thereon and said base body having a wall thickness at said base thickening;

said base of said base body having an inner side facing away from said at least one anchor;

said base thickening being arranged on said base at said inner side thereof at least in a region of said at least one anchor;

said base being subdivided into a mid region extending in said longitudinal direction in spaced relationship to said side walls and two side regions likewise extending in said longitudinal direction to cause said mid region to be in spaced relationship to said side walls;

said base thickening being disposed in said mid region spaced from said side walls;

said base having a wall thickness in each of said side regions which is uniform over all of each of said side regions and is less than said wall thickness at said base thickening so as to cause the wall thickness of said base to increase from the wall thickness of each of said side regions to said wall thickness of said base thickening in said mid region; and, said side regions of said base defining respective flat planar surfaces facing toward said free limbs.

2. The anchoring rail of claim 1, wherein:
said base has a base width (B) and defines a longitudinal extent;
said base thickening extends over the entirety of said longitudinal extent of said base; and,
said base thickening extends transversely to said longitudinal direction over a partial width (b) of said base width (B).

3. The anchoring rail of claim 2, wherein:
said base thickening is thicker in regions near said at least one anchor than in regions of said base near said first and second side walls;
said base defines a base thickness profile transverse to said longitudinal direction;
said base thickening defines a base thickening thickness profile transverse to said longitudinal direction; and,
said base thickness profile, at any location of the anchoring rail, corresponds to said base thickening thickness profile in the region of said anchor.

4. The anchoring rail of claim 1, wherein:
said first free limb is associated with said first side wall;
said anchoring rail further comprises a wall thickening configured as a side wall thickening formed on said first side wall in a region near to said first free limb;
said first side wall defines a first side wall height (H); and,
said side wall thickening extends over at least a partial height (h) of said first side wall height (H).

5. The anchoring rail of claim 4, wherein said side wall thickening extends over the entirety of said first side wall height (H).

6. The anchoring rail of claim 1, wherein:
said first free limb is associated with said first side wall;
said second free limb is associated with said second side wall;
at least one of said first and said second free limbs has a free limb thickening in a region near to the corresponding one of said first side wall and said second side wall and defines a free limb width (L); and,
said free limb thickening extends over at least a partial width (l) of said free limb width (L).

7. The anchoring rail of claim 6, wherein said free limb thickening extends over the entirety of said free limb width (L).

8. The anchoring rail of claim 1, wherein said base body has a plurality of thickenings corresponding to said thickening and each of said thickenings has an equal thickness ($v_s$, $v_b$).

9. The anchoring rail of claim 1, wherein:
said first free limb is associated with said first side wall and has a first wall thickness; and,
said first wall thickness increases in thickness from the first side wall to said slot.

10. The anchoring rail of claim 1, wherein:
said first free limb and at least a part of said first side wall adjacent to said first free limb are orthogonal with respect to each other; and,
said second free limb and at least a part of said second side wall adjacent to said second free limb are orthogonal with respect to each other.

11. The anchoring rail of claim 1, wherein:
said first and said second side walls are arranged perpendicular with respect to said base;
said first and second side walls and said base conjointly form outer edges;
said first and said second side walls are parallel to each other;
said first free limb has a first surface at a region of said first side wall facing away from said base;
said second free limb has a second surface at a region of said second side wall facing away from said base; and,
said first and said second surfaces are arranged at the same height and perpendicular to said first and said second side walls.

12. The anchoring rail of claim 1, wherein:
said first free limb has a first inner side facing said base and enclosing an angle of <90° with said first side wall; and,
said second free limb has a second inner side facing said base and enclosing an angle of <90° with said second side wall.

13. The anchoring rail of claim 1, wherein each one of said first and second side walls has a lower planar wall portion extending upward from said base and an upper planar wall portion extending from said lower planar wall portion to at least the free limb corresponding to said one side wall; and,
said lower planar wall portion has a first wall thickness and said upper planar wall portion has a second wall thickness greater than said first wall thickness.

14. An anchoring ail for anchoring in concrete, the anchoring rail being a longitudinally extending anchoring rail defining a longitudinal direction, the anchoring rail comprising:
a base body configured only of a base and first and second side walls;
said base body having first and second outer edges lying opposite each other;

said first and second outer edges being formed by respective ones of said first and second side walls being bent over relative to said base;

said first and second outer edges extending in said longitudinal direction;

first and second free limbs arranged on corresponding ones of said first and second side walls so as to lie opposite said base;

said base body and said first and second free limbs conjointly defining exclusively a substantially C-shaped form when viewed in section perpendicular to said longitudinal direction;

said first and second free limbs conjointly defining a slot therebetween extending in said longitudinal direction;

said base having an inner side and an outer side;

said outer side facing away from said first and second free limbs and being delimited by said first and second outer edges;

said outer edges being free and uncovered;

said outer side of said base being planar;

at least one anchor being arranged on said base at a location centered thereon with respect to said direction transverse to said longitudinal direction;

said outer side of said base having a connection position with said at least one anchor;

said at least one anchor being connected directly to said outer side of said base at said connection position;

said connection position being disposed at the center of said base with respect to a direction transverse to said longitudinal direction;

said at least one anchor extending in a direction perpendicular to said outer side of said base;

said planar outer side of said base body defining a clear planar outer surface uninterrupted except for said at least one anchor;

said base having a base thickening at said inner side thereof;

said base thickening having a wall thickness and being arranged on said base so as to be disposed opposite said connection position;

said base being subdivided into a mid region extending in said longitudinal direction in spaced relationship to said side walls and two side regions likewise extending in said longitudinal direction to cause said mid region to be in spaced relationship to said side walls;

said base thickening being disposed in said mid region spaced from said side walls;

said base having a wall thickness in each of said side regions which is uniform over all of each of said side regions and is less than said wall thickness at said base thickening so as to cause the wall thickness of said base to increase from the wall thickness of each of said side regions to said wall thickness of said base thickening in said mid region; and, said side regions of said base defining respective flat planar surfaces toward said free limbs.

15. The anchoring rail of claim 14, wherein each one of said first and second side walls has a lower planar wall portion extending upward from said base and an upper planar wall portion extending from said lower planar wall portion to at least the free limb corresponding to said one side wall; and, said lower planar wall portion has a first wall thickness and said upper planar wall portion has a second wall thickness greater than said first wall thickness.

* * * * *

UNITED STATES PATENT AND TRADEMARK OFFICE
CERTIFICATE OF CORRECTION

PATENT NO. : 10,385,563 B2
APPLICATION NO. : 15/132029
DATED : August 20, 2019
INVENTOR(S) : Albartus et al.

Page 1 of 1

It is certified that error appears in the above-identified patent and that said Letters Patent is hereby corrected as shown below:

On the Title Page

On page 2, item (56):
Under "U.S. PATENT DOCUMENTS", Column 2, Line 41, reference no. 2016/0305114: insert -- et al -- after "Albartus".

In the Claims

In Column 18:
Line 60: delete "anchoring ail" and substitute -- anchoring rail -- therefor.

Signed and Sealed this
Twenty-eighth Day of January, 2020

Andrei Iancu
*Director of the United States Patent and Trademark Office*